US012151270B1

(12) United States Patent
Carter

(10) Patent No.: US 12,151,270 B1
(45) Date of Patent: *Nov. 26, 2024

(54) METHOD AND APPARATUS, INCLUDING HOSE REEL, FOR CLEANING AN OIL AND GAS WELL RISER ASSEMBLY WITH MULTIPLE TOOLS SIMULTANEOUSLY

(71) Applicant: TRI-STATE ENVIRONMENTAL, LLC, Brooklyn, MS (US)

(72) Inventor: Anthony Scott Carter, Petal, MS (US)

(73) Assignee: TRI-STATE ENVIRONMENTAL, LLC, Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,883

(22) Filed: Aug. 22, 2023

Related U.S. Application Data

(63) Continuation of application No. 16/780,001, filed on Feb. 3, 2020, now Pat. No. 11,819,891, which is a (Continued)

(51) Int. Cl.
*E21B 37/00* (2006.01)
*B08B 9/035* (2006.01)

(Continued)

(52) U.S. Cl.
CPC ............ *B08B 9/0433* (2013.01); *B08B 9/035* (2013.01); *E21B 12/06* (2013.01); *E21B 17/006* (2013.01); *E21B 37/00* (2013.01); *E21B 17/01* (2013.01)

(58) Field of Classification Search
CPC ........ E21B 12/06; E21B 17/006; E21B 37/00; E21B 17/01; B08B 9/0433; B08B 9/035
See application file for complete search history.

(56) References Cited

U.S. PATENT DOCUMENTS 1,704,364 A 3/1929 Markley
2,117,648 A 5/1938 Bolttorf (Continued)

FOREIGN PATENT DOCUMENTS

WO WO2016001262 1/2016

*Primary Examiner* — Blake Michener
(74) *Attorney, Agent, or Firm* — Garvey, Smith & Nehrbass, 1Patent Attorneys, L.L.C.; Charles C. Garvey, Jr.; Vanessa M. D'Souza

(57) ABSTRACT

The present invention relates to a method and apparatus for cleaning an oil and gas well riser section or assembly. Even more particularly, the present invention relates to an improved method and apparatus for cleaning oil and gas well riser sections wherein a specially configured cap or pair of caps are fitted to the ends of the riser which enable pressure washing cleaning tools (or a camera) to be inserted into and through the riser cleaner fluid continuously recirculates so that relatively small volume of cleaning fluid (for example between about 700 and 1,000 gallons) is required. The cleaning process uses a volume of cleaning fluid that is discharged from the riser pipe at a relatively high temperature of about between 10° and 180° F. Such a high temperature cleaning fluid could possibly damage the pump that is used for supplying pressurized fluid to the cleaning tool. The present invention provides a method and apparatus for enabling continuous recirculation of fluid to the cleaning tool at a flow rate of between about 7 and 12 gallons per minute while lowering the temperature to about 60° F.

19 Claims, 36 Drawing Sheets

Related U.S. Application Data continuation of application No. 15/814,014, filed on Nov. 15, 2017, now Pat. No. 10,596,605.

(60) Provisional application No. 62/567,662, filed on Oct. 3, 2017, provisional application No. 62/422,532, filed on Nov. 15, 2016.

(51) Int. Cl.

| | |
|---|---|
| ***B08B 9/043*** | (2006.01) |
| ***E21B 12/06*** | (2006.01) |
| ***E21B 17/00*** | (2006.01) |
| ***E21B 17/01*** | (2006.01) |

(56) References Cited

U.S. PATENT DOCUMENTS

| | | | | |
|---|---|---|---|---|
| 2,953,799 | A | | 9/1960 | Arnold |
| 4,164,325 | A | | 8/1979 | Watson |
| 4,508,577 | A | | 4/1985 | Conn et al. |
| 4,514,270 | A | | 4/1985 | Furutani et al. |
| 4,666,530 | A | | 5/1987 | Houser |
| 5,067,558 | A | | 11/1991 | Boisture |
| 5,159,956 | A | | 11/1992 | Kurihara |
| 5,217,166 | A | | 6/1993 | Schulze |
| 5,323,797 | A | | 6/1994 | Rankin |
| 5,664,992 | A | | 9/1997 | Williams, Jr. |
| 5,964,414 | A | | 10/1999 | Hardy et al. |
| 6,158,076 | A | | 12/2000 | Rutkowski et al. |
| 7,040,331 | B2 | | 5/2006 | Garman et al. |
| 8,118,091 | B2 | | 2/2012 | Baker et al. |
| 8,465,597 | B2 | | 6/2013 | Turner |
| 8,505,845 | B2 | | 8/2013 | Zink |
| 9,844,803 | B1 | | 12/2017 | Carter |
| 10,174,564 | B1 | | 1/2019 | Carter |
| 10,195,650 | B1 | | 2/2019 | Carter |
| 10,562,080 | B1 | | 2/2020 | Carter |
| 10,596,605 | B1 | | 3/2020 | Carter |
| 11,819,891 | B1 | * | 11/2023 | Carter ..................... B08B 9/035 |
| 2004/0050553 | A1 | | 3/2004 | Edvardsen et al. |
| 2004/0069331 | A1 | | 4/2004 | Garman et al. |
| 2011/0052328 | A1 | | 3/2011 | Frerich et al. |
| 2011/0155174 | A1 | | 6/2011 | Moll et al. |
| 2012/0103368 | A1 | | 5/2012 | Gromes, Sr. |
| 2014/0053874 | A1 | | 2/2014 | Mackenzie et al. |
| 2014/0060849 | A1 | | 3/2014 | Pathak |
| 2014/0196954 | A1 | | 7/2014 | Mahmood et al. |
| 2015/0246789 | A1 | | 9/2015 | Gromes, Sr. et al. |
| 2017/0106413 | A1 | | 4/2017 | David et al. |
| 2018/0030814 | A1 | | 2/2018 | Mackenzie |
| 2019/0024483 | A1 | | 1/2019 | Bashford |

* cited by examiner

METHOD AND APPARATUS, INCLUDING HOSE REEL, FOR CLEANING AN OIL AND GAS WELL RISER ASSEMBLY WITH MULTIPLE TOOLS SIMULTANEOUSLY

CROSS-REFERENCE TO RELATED APPLICATIONS

Incorporated herein by reference are U.S. Provisional Patent Application No. 62/567,662, filed 3 Oct. 2017; U.S. Provisional Patent Application No. 62/422,532, filed 15 Nov. 2016; U.S. Provisional Patent Application No. 62/164,978, filed 21 May 2015; U.S. Provisional Patent Application No. 62/191,991, filed on 13 Jul. 2015; U.S. Provisional Patent Application No. 62/245,697, filed 23 Oct. 2015; U.S. Provisional Patent Application No. 62/329,341, filed 29 Apr. 2016; U.S. Provisional Patent Application No. 62/068,441, filed 24 Oct. 2014; and U.S. patent application Ser. No. 14/923,107, filed 26 Oct. 2015.

This patent application is a continuation of U.S. patent application Ser. No. 16/780,001, filed 3 Feb. 2020, which issued as U.S. Pat. No. 11,819,891 on 21 Nov. 2023, which is a continuation of U.S. patent application Ser. No. 15/814,014, filed 15 Nov. 2017, which issued as U.S. Pat. No. 10,596,605 on 24 Mar. 2020, and which claims the benefit of U.S. Provisional Patent Application No. 62/422,532, filed 15 Nov. 2016; and, 62/567,662, filed 3 Oct. 2017. Priority of U.S. Provisional Patent Application No. 62/422,532, filed 15 Nov. 2016; and, 62/567,662, filed 3 Oct. 2017, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the cleaning of oil and gas well riser sections or assemblies. More particularly, the present invention relates to a method and apparatus for cleaning an oil and gas well riser section or assembly on location offshore that includes a larger diameter central pipe and a plurality of smaller diameter pipes that are spaced radially away from the central larger diameter pipe. Even more particularly, the present invention relates to an improved method and apparatus for cleaning oil and gas well riser sections wherein a specially configured cap or pair of caps are fitted to the ends of the riser which enable pressure washing cleaning tools (or a camera) to be inserted into and through a selected one of the pipes including either a smaller diameter of the pipes or the central larger diameter pipe and wherein the cap continuously collects spent cleaning fluid and debris, allowing the cleaning process to be done on location without transporting the riser section back onshore.

2. General Background of the Invention

Oil and gas well riser sections typically include a central larger diameter pipe or tubular member that is surrounded by a plurality of three, four, or more, smaller diameter pipes held in spaced relation to the central pipe with plates or flanges. Flanges are provided at each end of the riser assembly or riser section. These flanges include openings that communicate with the bore or bores of the smaller diameter pipes. The flange has a central opening that communicates with the bore of the central larger diameter pipe.

In order to clean these pipe sections, it is necessary to remove rust, scale, debris, chemical deposits and the like from both the inner larger diameter pipe section bore as well as the smaller outer or peripherally placed pipe section bores. In order to avoid contamination, this cleaning process has been done onshore by removing and transporting the riser pipe sections from the offshore well, to an onshore cleaning site. Newer cleaning methods move the cleaning process offshore allowing the risers to be cleaned without removing them from the well. These methods require additional considerations to avoid having the removed rust, scale, debris, and chemical deposits be washed into the ocean. Additionally, there is a need to decrease the footprint of the machinery used in the cleaning process allowing it to be used offshore. There is also a need to speed up the cleaning process in order to make it more economical and efficient than removing the risers for cleaning.

BRIEF SUMMARY OF THE INVENTION

The present invention thus provides a method and apparatus for cleaning oil and gas well riser sections wherein the riser section includes a central larger diameter pipe or tubular member having a flow bore and a plurality of smaller diameter pipes or tubular members that are preferably connected to the central larger diameter tubular member with flanges or spacers. Each of the smaller diameter tubular members has a flow bore.

The method includes placing a first cap or fitting on one end portion of the riser section. The fitting preferably covers an end of the larger diameter tubular member as well as the ends of the smaller diameter tubular members. The fitting preferably has multiple openings including one or more centrally located openings and can have a plurality of circumferentially spaced apart outer openings that are each spaced radially away from the one or more centrally located openings. The fitting can include a cylindrically shaped portion and a circular portion that is preferably joined to cylindrically shaped portion. A flexible sealing member preferably helps join the cap or fitting to an end of the riser assembly.

In a preferred embodiment, a similar cap is also secured to the opposite side of the pipe to be cleaned, allowing for cleaning to take place in both directions simultaneously while also collecting the debris. The fluid that is used to clean the bore of the riser section is preferably recirculated and cleaned in one embodiment. This enables the use of a much smaller volume of fluid (for example, water plus detergent) as opposed to a system that continuously discharges the spent cleaning fluid without any treatment. In this alternate embodiment, temperature control enables the spent cleaning fluid to be cooled from an upper, warmer temperature range of between about 100 and 180° F. to a lower, cooler temperature range of between about 50 and 80° F.

The method includes inserting a first cleaning tool through the centrally located opening and into the larger diameter tubular member. The cleaning tool includes a pressure washing tool that cleans the inside surface of the larger diameter tubular member. A hose preferably supplies fluid under pressure to the first cleaning tool.

The method can include the inserting of a second cleaning tool through one or more outer or peripherally placed openings and into one of the smaller diameter tubular members. The smaller diameter tubular members are cleaned with a second pressure washing tool that preferably cleans the inside surface of the smaller diameter tubular member or members, one after the other. In preferred embodiments, additional smaller diameter cleaning tools may also be used in the other smaller diameter tubular members simultaneously.

The method can include the suction of fluid from the cleaning operations via a fitting or discharge that is preferably placed at a lower end portion of the fitting so that gravity flow can remove such cleaning fluid on a continuous basis.

The outer openings are preferably positioned along a curved line that is radially spaced outwardly of the centrally located opening or openings, the curved line traversing each of the outer tubular members.

In one embodiment, each centrally located opening is generally aligned with the bore of the larger diameter tubular member.

In one embodiment, one or more outer opening are generally aligned with the bore of a smaller diameter tubular member.

In one embodiment, the riser section or assembly has one end portion with an annular flange, each tubular member connected to the flange and the fitting preferably attaches to the annular flange.

In one embodiment, the flange has an outer diameter and the fitting has a peripheral skirt with a seal having a diameter that is about equal to the flange outer diameter. Further, the method preferably includes attaching the fitting at the peripheral skirt to the annular flange.

In one embodiment, there are two caps or fittings, each preferably having a fitting being attached to each end portion of the riser section or assembly. In this embodiment, the cleaning tools may all be fed into the bores from the same end, or, alternatively, one or more cleaning tools can be fed into the pipe from one end, while one or more additional cleaning tools are fed into different bores from the opposite end allowing cleaning to take place in both directions simultaneously.

In one embodiment, a suction is applied to each of the caps or fittings to subject all flow bores of the riser section to a vacuum during cleaning operations. Preferably, the vacuum at least partially contributes to securing the caps or fittings to the riser section.

In one embodiment, there are at least three outer openings.

In one embodiment, there are between two and twenty outer openings.

In one embodiment, the outer openings are preferably arranged in a circle.

In one embodiment, some of the outer openings are aligned with a smaller diameter tubular member bore and some of the outer openings are not aligned with a smaller diameter tubular member bore.

In an alternate embodiment, a method of cleaning an oil and gas well riser is provided wherein the cleaning fluid is heated (e.g., during cleaning) to a range of between about 100 and 180° F., recirculated, and cooled to a lower temperature range of between about 50 and 70° F. The method includes placing a fitting at one or both ends of the riser section. The fitting having a drain opening for receiving the discharged dirty cleaning fluid. The fitting provides an opening such as a centrally positioned opening that accepts a cleaning tool so that the cleaning tool can move along the inside surfaces of the bore, cleaning the bore with highly pressurized fluid that can be provided by a high pressure pump. The cleaning process elevates the temperature of the cleaning fluid to between about 100 and 180° F.

After discharge from the fitting, the removed cleaning fluid is filtered and then transmitted to a first holding tank. From the first holding tank, water is transmitted to a first heat exchanger. A second heat exchanger is also employed that is a refrigerated heat exchanger employing a coolant such as Freon (commercial refrigerant). A tank is positioned in between the first and second heat exchangers. Cleaning fluid is thus recirculated from one or both of the heat exchangers to the tank such as for example when the cleaning tool is not discharging fluid. After filtering and cooling, the cleaning fluid is then recirculated to the high pressure pump and cleaning tool for additional cleaning of the riser section.

This alternate method enables cleaning of riser sections with a much smaller volume of fluid such as between about 100 and 2,000 gallons of fluid, and more particularly between about 100 and 500 gallons of fluid.

For further information regarding preferred embodiments of the present invention, see Appendix A attached to my U.S. Provisional patent application No. 62/422,532, filed 15 Nov. 2016, which is hereby incorporated herein by reference.

The present invention includes a new component of the riser cleaner apparatus of the present inventors prior patent applications referenced herein. It was invented to assist in keeping line control of high pressure line leading into the Autobox feeder. This was invented to ergonomically assist the operators who, formerly, fed the Autobox. They had difficulty feeding the line and organizing the line for tripping in and out multiple times per riser all day long.

The present invention includes a method of cleaning an oil and gas well tubular or riser section. The method includes inserting a cleaning tool into the riser wherein the cleaning tool can clean the inside surface of the tubular riser section with cleaning fluid, removing fluid from the cleaning operations via the drain opening, wherein the removed fluid can have a temperature of between about 100 and 180° F.; moving the cleaning tool with a hose, wherein a feed tool selectively pushes or pulls the hose; housing the hose in a container that can have inner and outer sidewalls, an annular space between the sidewalls, and an opening in the inner side wall that connects with a rotary fluid conveying swivel fitting; and wherein the container rotates when paying out or when retrieving the hose.

In various embodiments, the container can have a bottom panel and further comprising resting the hose on the bottom panel.

In various embodiments, the hose can extend through the opening.

In various embodiments, the swivel can include an ell or "L" shaped portion and further comprising flowing the cleaning fluid through the ell or "L" shaped portion.

In various embodiments, the swivel can extend through the bottom panel.

In various embodiments, the container can be mounted to a skid, truck bed or trailer bed and the swivel fitting can include a portion that extends through the skid, truck bed or trailer bed.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
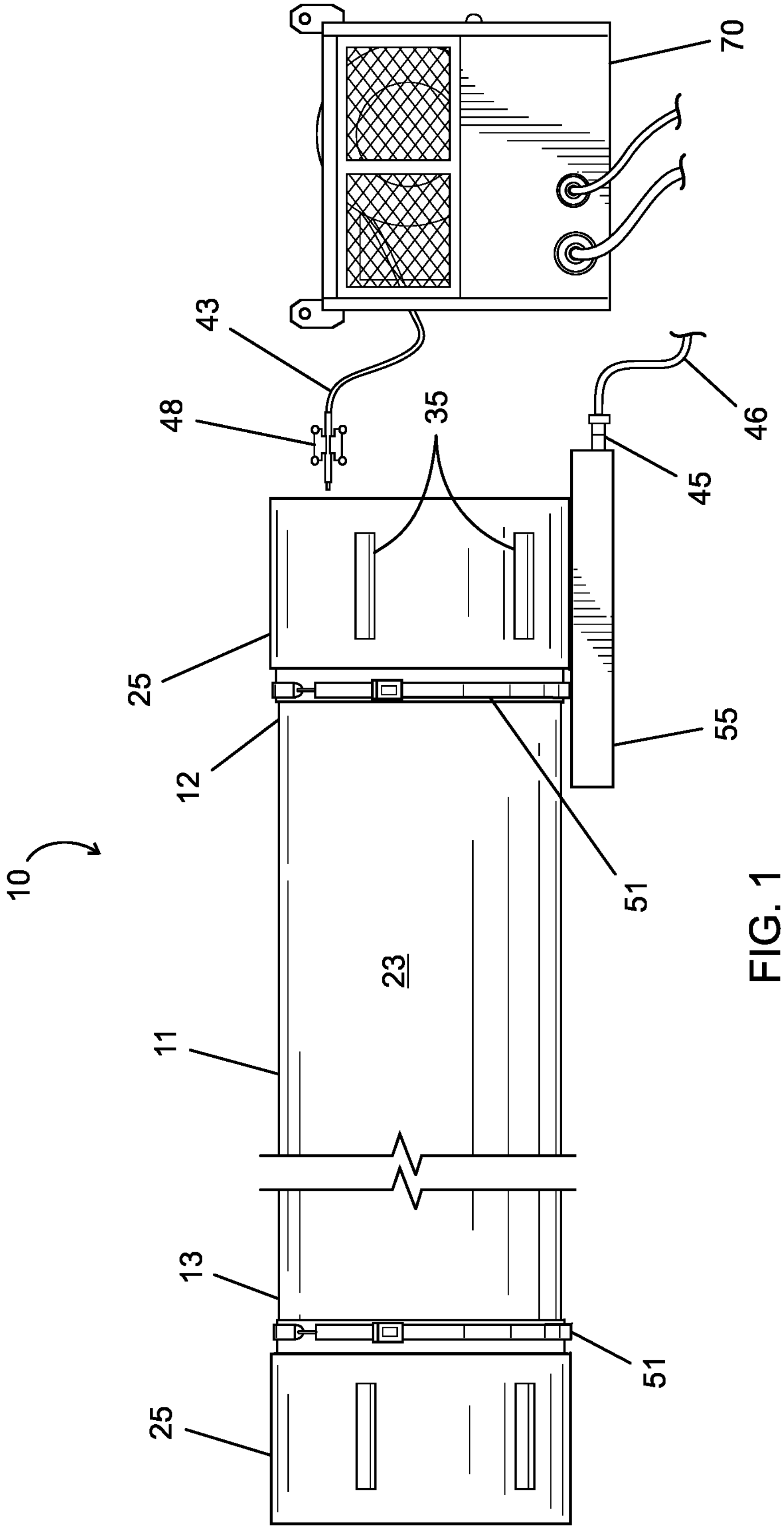
FIG. 1 is a schematic of a preferred embodiment of the method and apparatuses of the present invention with the cleaning tool out of the pipe.

In FIGS. 1-8, riser cleaning apparatus 10 is used to clean a riser assembly such as the riser assembly 11 shown in the drawings. Such a riser assembly 11 has a first end portion 12 and second end portion 13. Either or both of the end portions 12, 13 of the riser assembly 11 can be provided with an annular flange 14. The riser assembly 11 typically includes a larger diameter pipe or tubular member 15 surrounded by multiple smaller diameter pipes or tubular members 16.

Figure 6:
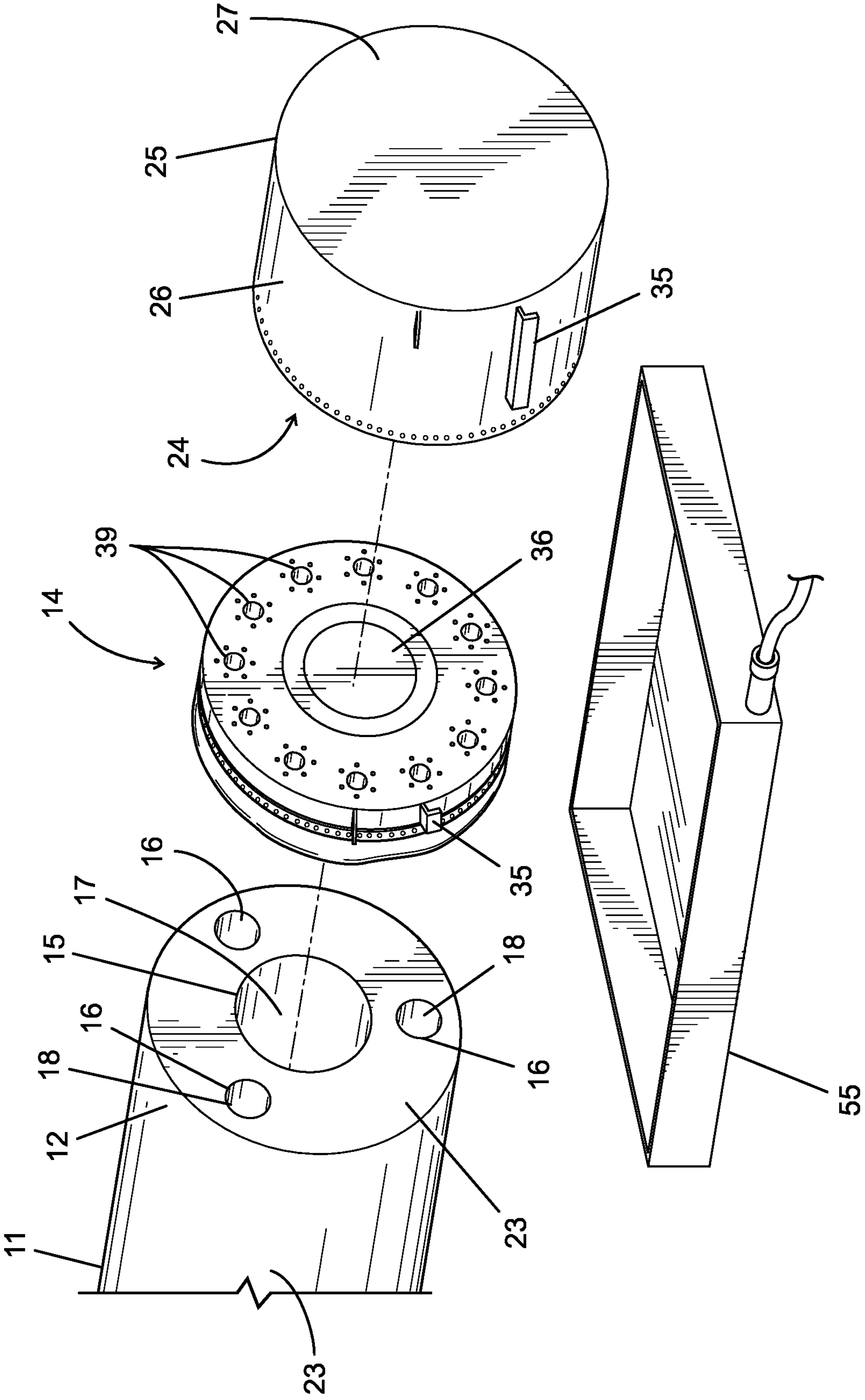
FIG. 6 is an exploded view of a preferred embodiment of the end cap, pipe, and drain pan of the present invention.
Figure 6A:
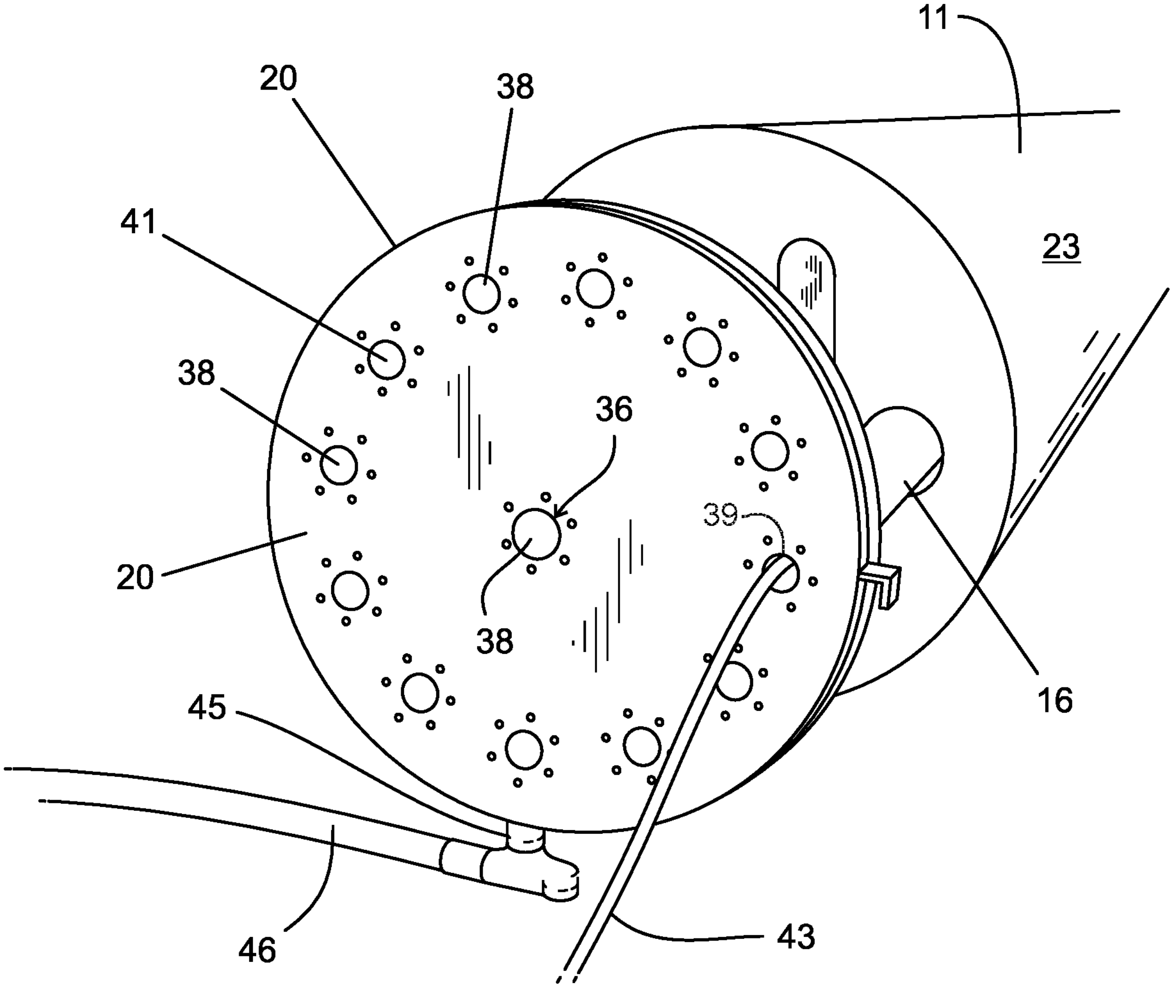
FIGS. 6A, 6B are fragmentary perspective views of a preferred embodiment of the apparatus of the present invention

The larger diameter pipe 15 has a pipe bore 17 of larger diameter. The smaller diameter pipes 16 each have a pipe bore 18 of smaller diameter. A flange 14, preferably an annular flange, can be a part of a riser assembly 11, as shown in FIG. 6. In the flange 14, there may be openings that do not align with a particular smaller diameter pipe 16. During cleaning, plugs (not shown) may be used to block any such openings so that fluid is not leaked through the openings. The riser assembly 11 can include an insulation layer or protective covering or coating 23.

The cleaning apparatus 10 of the present invention and the method of the present invention preferably employ one or more caps, fittings or shrouds 25. These caps, fittings or shrouds can be placed on one end portion 12 of the riser assembly 11 or on both end portions 12, 13 of the riser assembly 11.

Each cap, fitting or shroud 25 preferably includes a cylindrical section 26, a circular wall 27, and a concave portion or cavity 24. Wall 27 can be welded to cylindrical section 26. The cylindrical section 26 has an inner surface 28 and an outer surface 29. The circular wall has an inner surface 30 and an outer surface 31.

A gasket or seal 32 can be attached to cylindrical section 26. The gasket or seal 32 can be attached to the cylindrical section 26 using band 33 and fasteners such as rivets 34. Straps 51 can be used to hold each cap, fitting or shroud to a selected end portion 12, 13 of a riser assembly 11. One or more handles 35 can be attached (for example, welded) to circular wall 27 of cap or shroud 25. In one embodiment (not shown), a rope such as a wire rope is removably attached to the outer surface 29 in a manner to axially support the lifting of the cap 25.

Figure 6B:
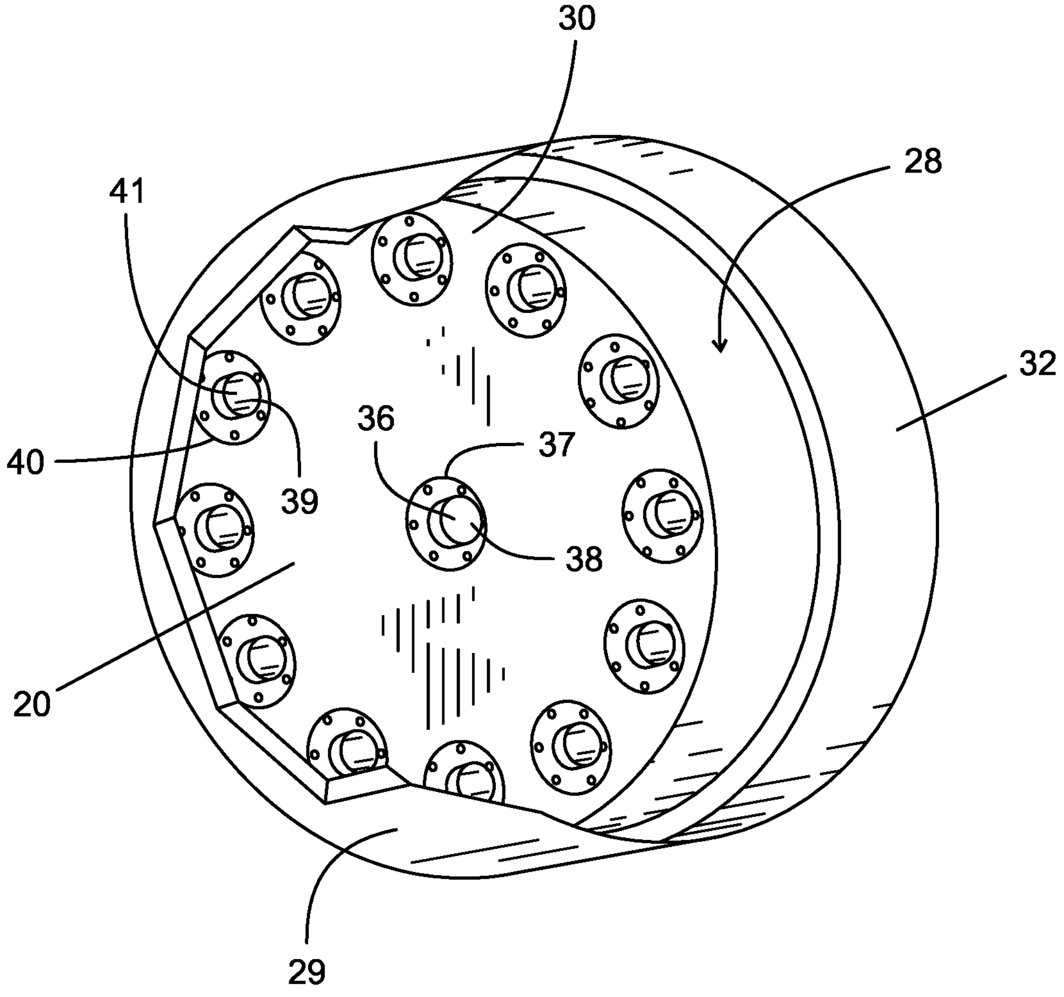

In one embodiment, the shroud 25 connects to a disk or circular member 20 that is provided with a plurality of openings 36, 39. These openings include central opening 36 and a plurality of peripheral openings 39. Each opening 36, 39 can be fitted with annular flange 37 or 40 and a seal or rubber sheet 38. In one embodiment, the flange 37 is preferably bolted to the flange disk 20 with fasteners, thus sandwiching the seal 38 in between the flange 37 and the disk 20. It should be understood that shroud 25 and disk 20 could be separable parts as shown in FIG. 6. Alternatively, the shroud 25 can include a circular end wall 27 having openings 36, 39 and flanges 37, 40 as well as seals/rubber sheets 38 and seal openings 41 as seen in FIG. 6B.

Each peripheral opening 39 is preferably fitted with an annular flange 40 and can include a seal 38 with an opening 41 that enables a hose 43 to pass through the seal 38 and its opening 41. The opening 41 in each seal 38 can thus be about the same inner diameter as the outer diameter of the hose 43.

Hose 43 supplies pressurized fluid to cleaning tool 48. Each seal 38 can have a small opening at 41 which allows insertion of the cleaning tool 48 and its pressurized hose 43 from the outer surface 31 of circular wall 27 to the inner surface 30 of circular wall 27, thus gaining access for the cleaning tool 48 and hose 43 to the bore 17 or 18 of a selected larger diameter pipe 15 or smaller diameter pipe 16 to be cleaned.

A hose feed device 44, such as AutoBox by StoneAge®, Model No. ABX-500, can be used to feed hose 43 into the selected bore 17 or 18 during cleaning, thus advancing the cleaning tool into and along a selected bore 17 or 18 until all of it is cleaned (i.e., inside surface of pipe 15 or 16).

Each cap or shroud 25 preferably has an outlet fitting 45 to which is attached a suction line 46. The suction line 46 would be coupled to a pump or like device that pulls the suction on the outlet fitting 45 and thus the interior of the riser assembly 11 in order to withdraw spent cleaning fluid. In one embodiment, caps or fittings or shrouds 25 are placed at both ends of the riser assembly 11, each of the caps or shrouds 25 having an outlet fitting 45 and a suction line 46. In this fashion, the suction lines 46 and their pumps assist in holding the caps or shrouds 25 to the riser assembly 11 by subjecting the entire interior of the riser assembly 11 to a vacuum. Hoses (not shown) can be attached to each flange 37, 40. Such hoses can be ell shaped and flexible Once cleaning is finished, a camera or like device can be used for inspecting the bores 17 or 18 (not shown). A camera line 49 can be provided as well as a camera feed device 50 for inserting the camera into a selected bore 17 or 18 (not shown).

Whereas Applicant, has cleaned risers by sending a high pressure cleaning tool down only one of the holes, in the riser, by way of a pneumatic feeder, in order for the offshore cleaning method to be economically superior to traditional onshore cleaning, the cleaning preferably occurs in a faster total time and cleaning equipment preferably takes up less total space on the well. To accomplish a faster cleaning time, the method of the present invention includes the option of cleaning all of the bores of a riser simultaneously. The largest bore 17 will preferably be cleaned by sending a high pressure cleaning tool 48, by way of a pneumatic feeder 44 on one end 12, 13. The three or four smaller bores 18 will preferably be cleaned in the same aforementioned fashion either on the same end, or on the opposite end of the riser 11 simultaneously.

To accomplish this faster cleaning while still taking up a smaller total space on the well, novel and improved cleaning tools 48 and assembly 10 have been developed. On one or both ends 12, 13 of the riser pipe 11, these cleaning tools 48 are being fed through the bores 17, 18 with high pressure water hoses preferably via pneumatic feeders 44.

A control panel can be provided to control, preferably pneumatically, multiple high pressure water hose feeders 44. A control panel may be adapted to control additional feeders 44, preferably four or six feeders 44.

Figure 8:
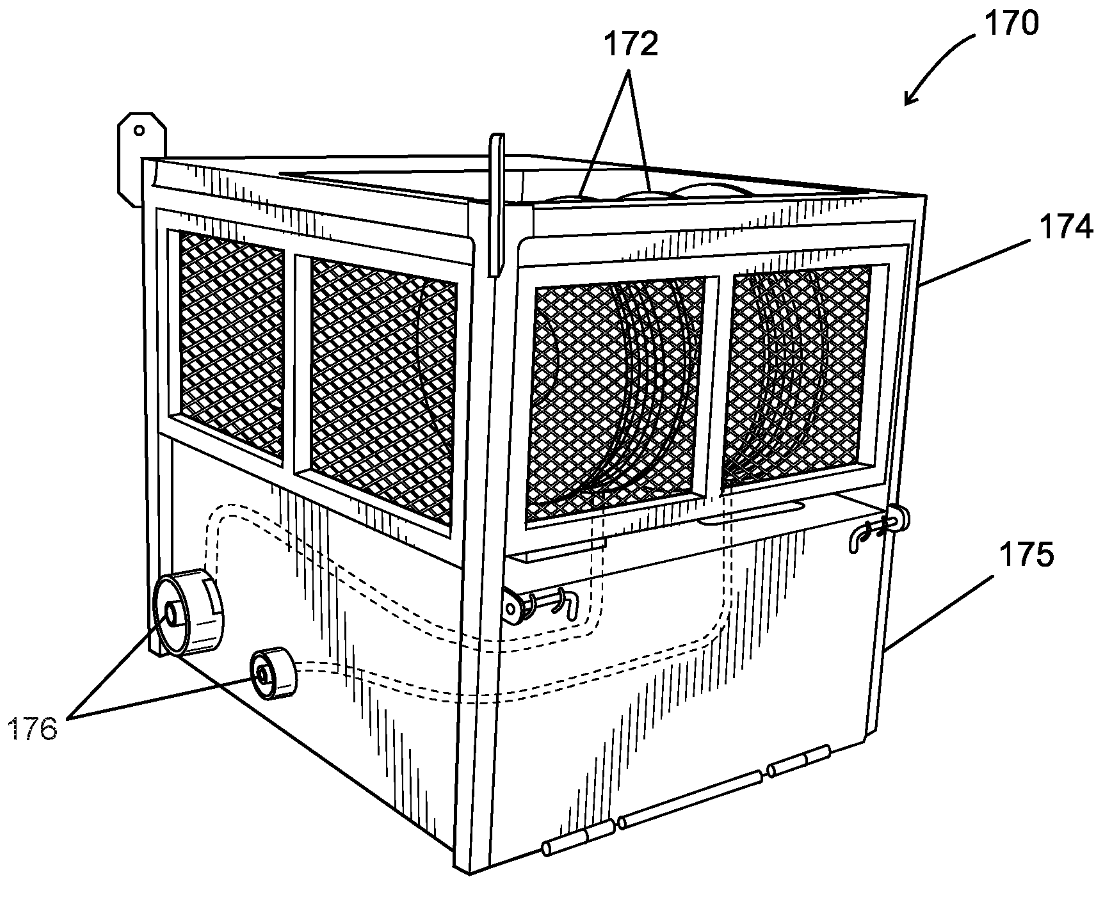
FIG. 8 is a perspective view of a preferred embodiment of the spool basket of the present invention.

To further decrease the total footprint, spool or reel basket 170 as shown in FIG. 8 is provided. The spool basket 170 preferably has pad eyes for industrial transportation that hold the one or more pneumatic feeders 44 and one or more respective spools 172 of high pressure water hose 43. The spool basket 170 of the present invention as shown in FIG. 8 has an upper section 174 and lower section 175. The lower section is adapted with housings 176 for the high pressure water lines 43, power lines, and control lines for the pneumatic feeders 44. As shown, the lower section has housings 176 for two feeders 44; however, additional housings can be added to accommodate additional feeders 44. The upper section holds two pneumatic feeders 44 and two reels 172, the reels coordinate with each respective feeder 44. However, the basket 170 can be adapted to hold more feeders 44 and spools 172. Preferably, additional feeders 44 and spools 172 would be stored on top of the feeders 44 and spools 172 shown so that the total footprint of the equipment is not increased.

In a preferred embodiment, a control panel is preferably positioned to reduce the footprint. For example, a control panel may be positioned next to the spool basket 170.

In one embodiment, the output of water for four tools being run simultaneously is preferably 15 gallons per minute (gpm) for the larger bore holes 16, and 8 gallons per minute (gpm) for the choke, kill and boost lines.

In one embodiment, the output of water for four tools being run simultaneously is preferably 39 gallons per minute (gpm).

In one embodiment, the total time to clean is approximately 15 minutes.

The control panel and spool basket 170 enable controlling of multiple high pressure water cleaning tools 48, simultaneously with minimal man power and minimal human exposure to moving parts.

In a preferred method, there can be two control panels and two spool baskets 170, with a spool basket 170 at each end 12, 13 of a riser 11, and the two control panels can be side by side on one end 12, 13 or remote from one another. Preferably, there is a separate human operator for each control panel, though if they are side by side one human operator is preferably able to operate both.

In another preferred embodiment, the control panel can be adapted to control four or six feeders 44, all of which are housed in one spool basket 170 as described above, at one end of the riser pipe 11.

The cleaning method of the present invention preferably makes use of an improved pressure washing tool 48 that cleans the inside surface of the larger diameter tubular member 15 and other improved pressure washing tools 48 that clean the inside surface of the smaller diameter tubular members 16 simultaneously. A cable or hose 43 preferably supplies fluid under pressure to the cleaning tools 48.

Figure 7:
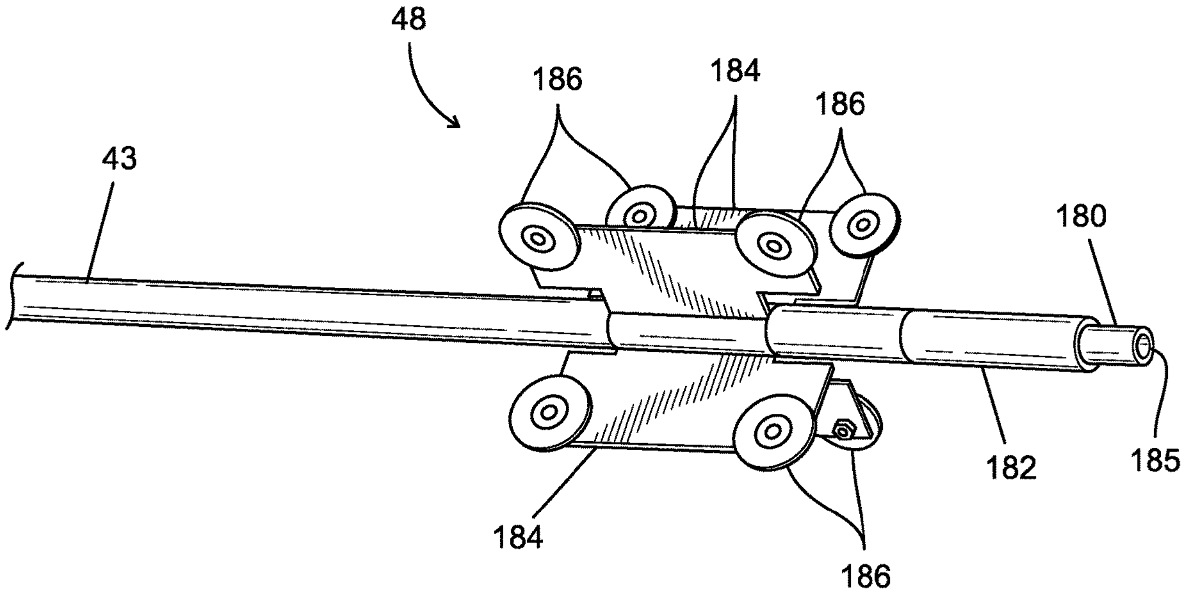
FIG. 7 is a perspective view of a preferred embodiment of the cleaning tool of the present invention.

In a preferred embodiment shown in FIG. 7, the pressure washing tool 48 of the cleaning method includes a head 180 connected to a tubular body 182, and a support structure surrounding the tubular body 182. The head 180 preferably includes at least one orifice 185. The orifice(s) 185 of the head 180 preferably allow pressurized water to pass through during cleaning. In one embodiment (not shown), the head 180 also includes more than one opening along the same axis that preferably allows for a stabilizer bar to pass through the openings. In a preferred embodiment, the support structure is extensions 184 that extend radially from the tubular body 182 of the tool 48. Preferably there are at least three extensions 184. More preferably there are four extensions 184. Most preferred, the extensions 184 have one or more wheels 186, preferably two wheels 186 on each of four extensions 184, as shown in FIG. 7. This design is preferable because the extensions stabilize the tool 48 in the center of the line, and the wheels 186 alleviate drag providing for a faster cleaning time. Additionally, wear and tear on the tool 48 is decreased, which lengthens the life of the tool 48. In another embodiment, additional wheels 186 may be added to the head or nose 180 of the tool 48, to alleviate dipping of the nose during cleaning. In another embodiment (not shown), the support structure is comprised of three or more leg-like extensions, the leg-like extensions having a proximal portion and distal portion, wherein the proximal portion extends radially out from the tool 48, at an angle between 30 and 90° from the tubular body 182, and wherein the distal portion is parallel to the inner wall of the bore 17, 18 to be cleaned. In this embodiment, the distal portion of the leg-like extension is equipped with one or more, preferably two, wheels that are adapted to roll along the inner wall of the bore 17, 18 to be cleaned. This embodiment may further include one or more wheels on the nose of the tool 48.

Prior versions of a cleaning tool for riser pipes did not have wheels 186 or extensions 184, which caused stripping of the tool. In those prior versions that did have extensions for support, the extensions were too short and allowed the nose of the tool to dip. Additionally, no wheels were provided which created significant drag in the riser that required more time and power to overcome.

In one embodiment of the present invention, an improved method of cleaning riser pipes is provided All PPE (personal protective equipment) to be worn is as follows; Hardhat, Steel-toed Boots, Safety Glasses, Flame Resistant Clothing (FRC) [Either coveralls of separate shirt/pants combinations], and Orange Reflective Vests. Equipment Operators will wear specialized PPE for optimal safety protection. One or more operators or crewmembers will survey conditions and check for hazards to ensure a safe operation. Operators or crewmembers will place equipment in a manner that avoids trip hazards and other safety hazards.

A crewmember will begin running lines 43, 46. The crewmember will connect a water line 43 from the pump (not shown) to a water line housing 176 on the Spool Basket 170. The housing connects to a "Y" connection that routes the high pressure water to each spool 172. Each spool 172 then connects to the feeder 44. One crewmember will set up diaphragm pumps, preferably two pumps, one for each end 12, 13 of the risers 11. Preferably, the diaphragm pumps are 2-inch pumps. The crewmember will then connect a discharge hose to the pump, preferably two hoses, also for each end 12, 13 of the risers 11. Preferably, the discharge hoses are 2-inch discharge hoses. The discharge hoses connect to the riser shroud 25, preferably by way of a 2-inch female camlock located at the bottom of the cap.

Crewmembers will set up and place the discharge containment system catch pan 55 so that no discharge spills on the rig floor. A crewmember will measure the depth of the rubber seals on both ends of each riser 11. Two markers will be placed on the lance-line signifying the corresponding depth of the rubber seals so as not to damage the rubber seals with, up to, 10,000 psi of water pressure.

Figure 2:
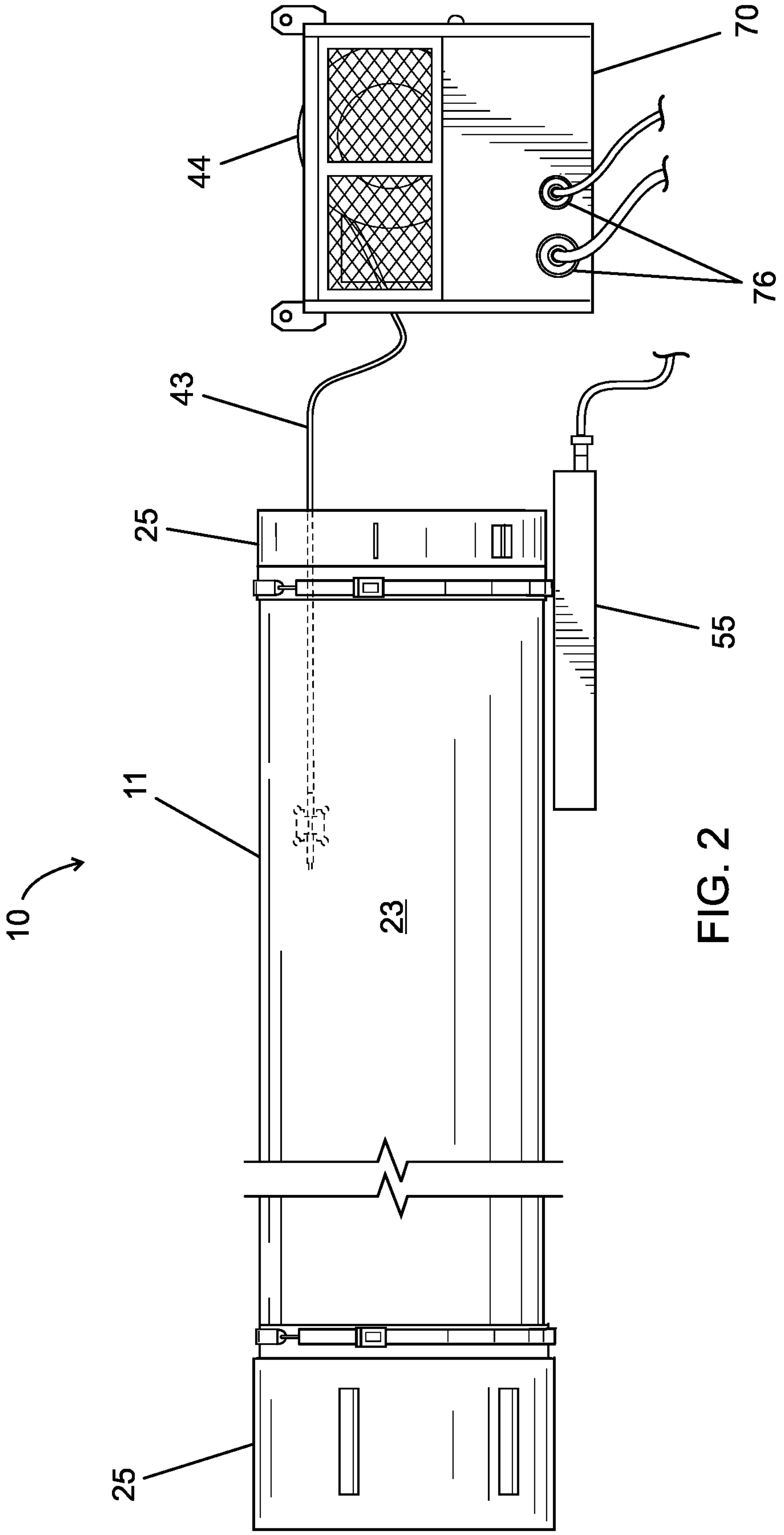
FIG. 2 is a schematic of a preferred embodiment of the method and apparatuses of the present invention with the cleaning tool in the pipe.
Figure 3:
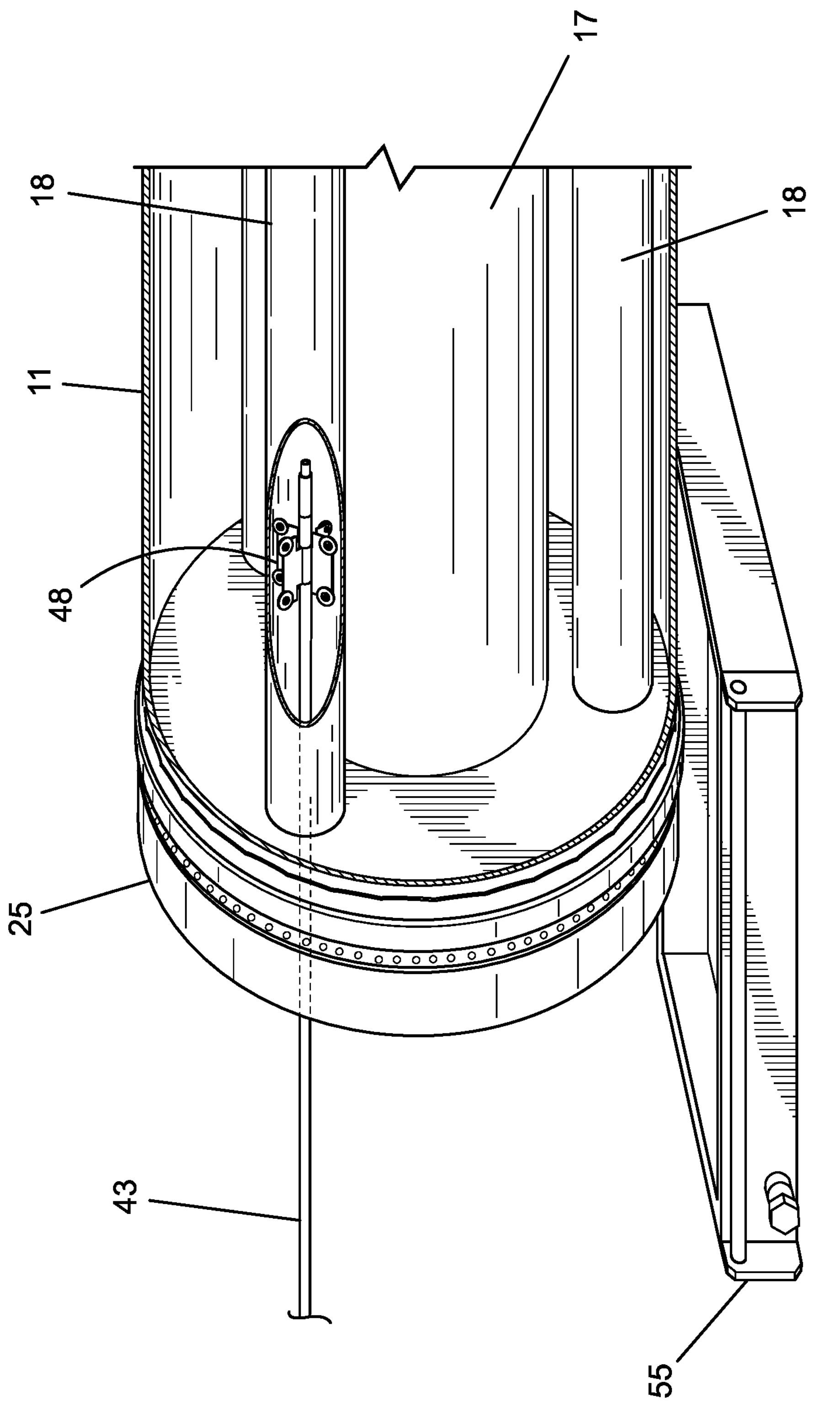
FIG. 3 is a close up side view of a preferred embodiment of the apparatus of the present invention with a cut-away showing the cleaning tool.
Figure 4:
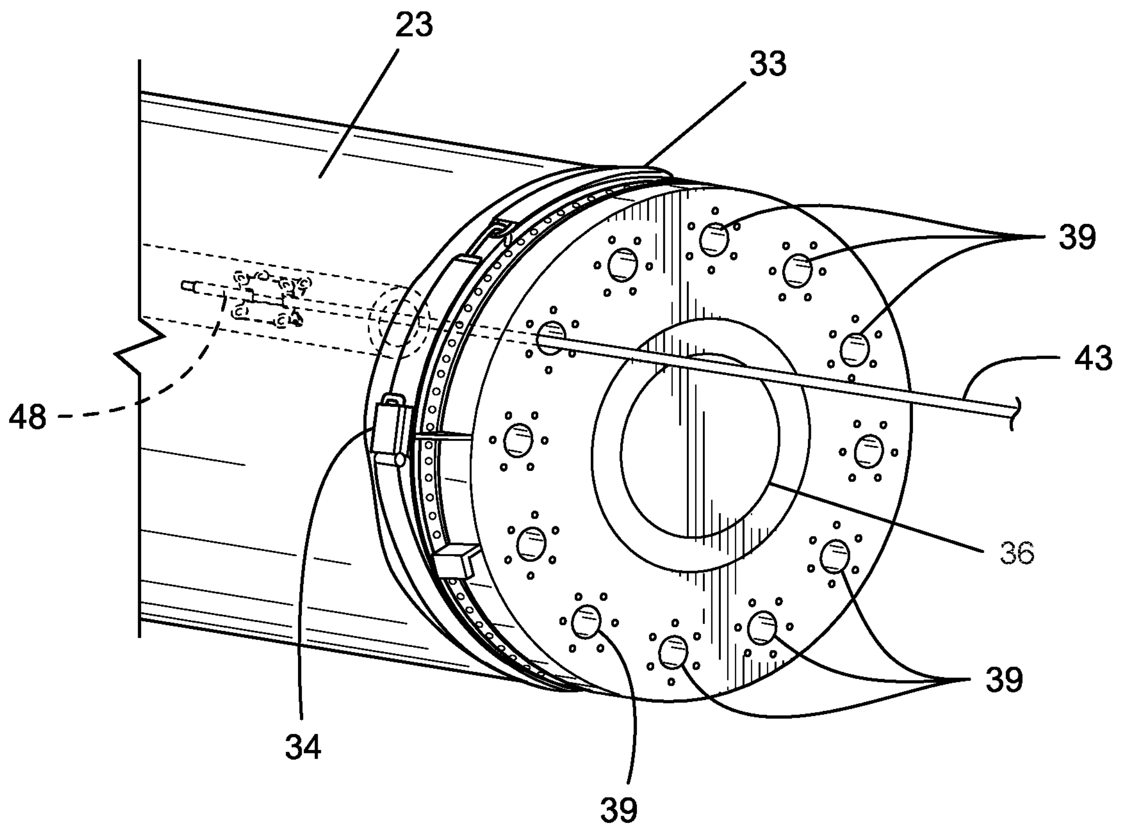
FIG. 4 is a close up front view of a preferred embodiment of an end cap of the present invention in place on a pipe with a cut-away showing the cleaning tool.
Figure 5:
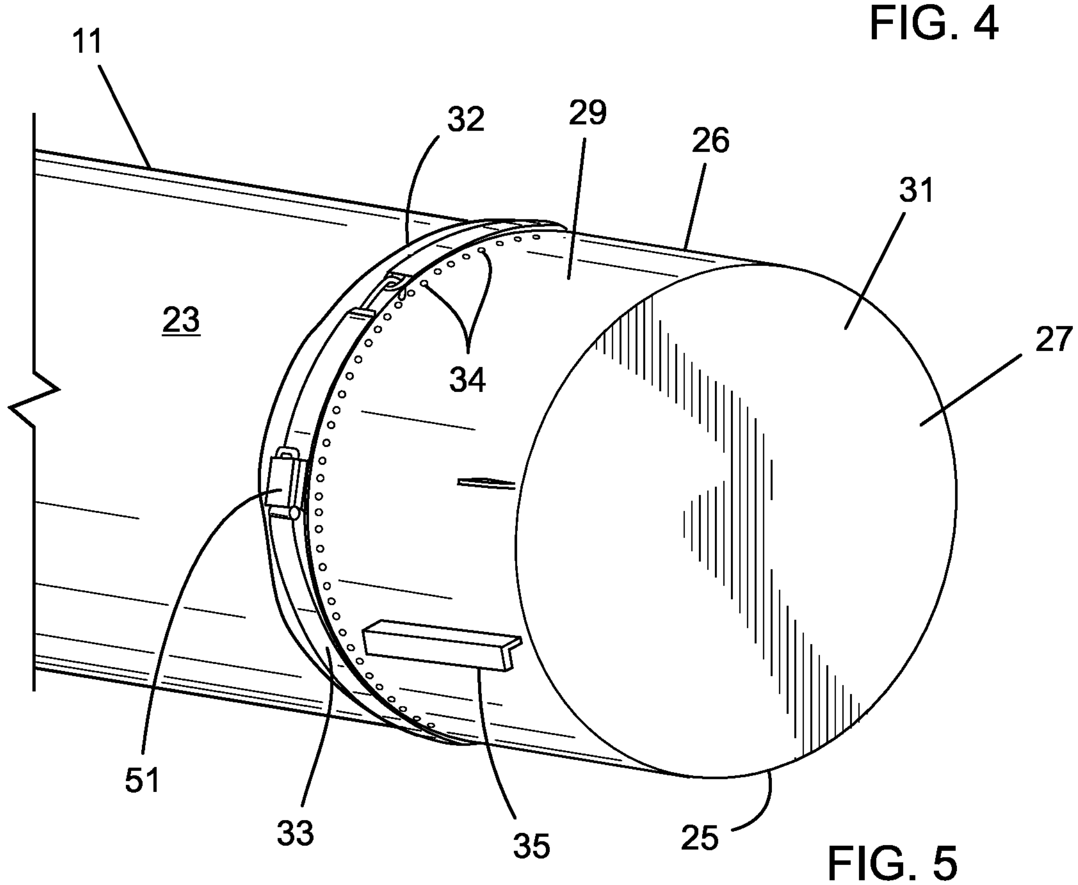
FIG. 5 is a close up front view of a preferred embodiment of an end cap of the present invention in place on a pipe.

The lance-lines 43 that coordinate with the one or more cleaning tools 48 will be threaded through the outside of the cap or shroud 25 inward, as shown in FIGS. 2-4. The lance-lines 43 will then be connected to the cleaning tools 48. The crewmembers will then close the shroud 25 over the outer diameter of the riser flange 14 and secure it, for example, with a band clamp 33 as shown in FIGS. 4-5. (Installation of caps or shrouds 25 on both ends is preferably identical.) On one end, crewmembers will rig up the cap 25, a preferably 2-inch suction hose 46, and the large and small cleaning tools 48 will be placed in their respective pipes 15, 16. The pump will have a rig-water line connected to it.

Shrouds or caps 25 are to be installed on both ends 12, 13. On each end of the riser 11 where they will secure the shroud or cap 25 around the outer diameter of the riser flange 14 with a band clamp/ratchet strap 33/51. The suction hose 46 will be connected to the 2-inch female camlock that is attached to the shroud or cap 25. Any bolt-holes will be plugged up. The 2-inch suction hose 46 will be connected to a 2-inch diaphragm pump. Once all components have all connections secured, and all shrouds 25 are installed, one or more lance-lines 43 with their respective tools 48 will be cleaning from one or both ends 12, 13.

A control panel can be used to actuate the feeders 44. With the water pressure high, the feeders 44 will begin moving the tools 48 down the length of the riser 11. Once to the end of the riser 11, the feeder 44 will be set in reverse and begin pulling the tools/lance-lines 48/43 back. This action will re-spool the lance-lines 43 onto the spools 172 in the spool basket 170. There are large tools 48 for large pipes 15 and small tools 48 for small pipes 16. The orifice(s) 185 in the tool 48 are preferably pointed to grab directionally forward for a faster initial trip.

Traditionally, a small cleaning tool, called a Banshee, was used to clean small holes in risers because it was small enough to fit in the auxiliary lines. The Banshee was small enough to be stung into the rubber seals of the caps; however the life of the Banshee's rotating mechanism was insufficient, and when rotating ceased, the tool would stripe interior surface area of auxiliary lines and the tool would bounce around on the inside of auxiliary lines. To improve on this, a slightly larger version of the Banshee called the Badger was developed. The Badger had a better rotating mechanism, so it was more dependable with no striping. Still, the Badger would eventually bounce around the inside of the lines, shortening the life of the tool. The cleaning tool 48 of the present invention provides centralizers or extensions 184, preferably with wheels 186, on the rear end of the tool 48. These improvements stabilize the tool 48 in the center of the bore 17, 18, and alleviate drag providing for a faster cleaning time. Additionally, they lengthen the life of the tool 48.

Centralizing fins have been added to the tool 48, and wheels were added to the nose. The fins centralize the tool in action, so there is less bouncing, and the wheels on the nose help to alleviate the dipping. But, neither the fins nor the wheels completely prevent the tool's nose from dipping, which causes the tool to stripe.

Centralizers 184 with a longer and larger frame with wheels 186 have been added to the cleaning tool 48 to overcome problems of the prior tools used. The wheels 186 alleviate drag. Additionally, the tool 148 is preferably machined with larger orifices 185, and with at least four 15° fan tips to help eliminate striping and provide for uniformed cleaning.

A control panel allows for control of multiple feeders 44 and reels 172. The control panel consolidates the pneumatic hoses that connect to the feeder 44. This control panel has the capabilities of controlling more than one feeder 44 simultaneously. In a preferred embodiment, shown in the figures, two feeders 44 are controlled simultaneously. In another embodiment, four feeders 44 are controlled simultaneously from the control panel. Additional feeders 44 may also be added. The control panel can incorporate a foot pedal into the panel board and is controllable by a toggle switch, further reducing the footprint of the equipment needed for the method.

The feeder 44 used in the method of the present invention is preferably controlled pneumatically. The feeder 44 clamps down on the high-pressure water lines (lance lines) 43. When actuated forward or backward, the lance line 43 will move forward and backward. This motion allows us to control the tripping of the lance line 43 and corresponding cleaning tool 48 down the length of the riser assembly 11. The pneumatic feeder 44 allows the operator to trip the lance line 43 forward and backward in the riser 11. In a preferred embodiment, a spool basket 170 is a portable enclosed tool box with two or more feeders 44, two or more spools 172 with lance lines 43 corresponding to the feeders 44, and connections 176 for pneumatic hoses and high pressure water lines to connect to their respective tools. This basket 170 is comprised of two or more feeders 44, two or more lance line spools 172, and connections 176 for pneumatic and water hoses lessening the footprint, and eliminating a number of tripping hazards. The spool basket 170 preferably has wheels (not shown), making it portable. The feeders 44 are positioned for ease of lance line 43 access to entry ports 36, 39 on the cap(s) or shrouds 25.

Caps or shrouds 25 are used on the ends of the riser 11 to contain discharge while maintaining the ability to stab the lance line 43 through a small hole 36, 39 in the cap 25. The cap 25 is preferably reinforced with aluminum, and rubber tubes are preferably placed on the interior of the stabbing holes to eliminate back pressured discharge. Multiple stabbing holes 36, 39 allow for multiple tools 48 and lines 43 to work in the cap 25 simultaneously. Finally, the addition of a discharge line 46, repositioned at a 900 angle allows for discharge back pressured waste.

A second shroud or cap 25 allows for capture of discharge, discharge pump-off, and cleaning from the opposite side of the riser 11. Preferably, a cavity is added for the large bore 17 so that a cleaning tool 48 can fit in and properly flush out the discharge.

Figure 9:
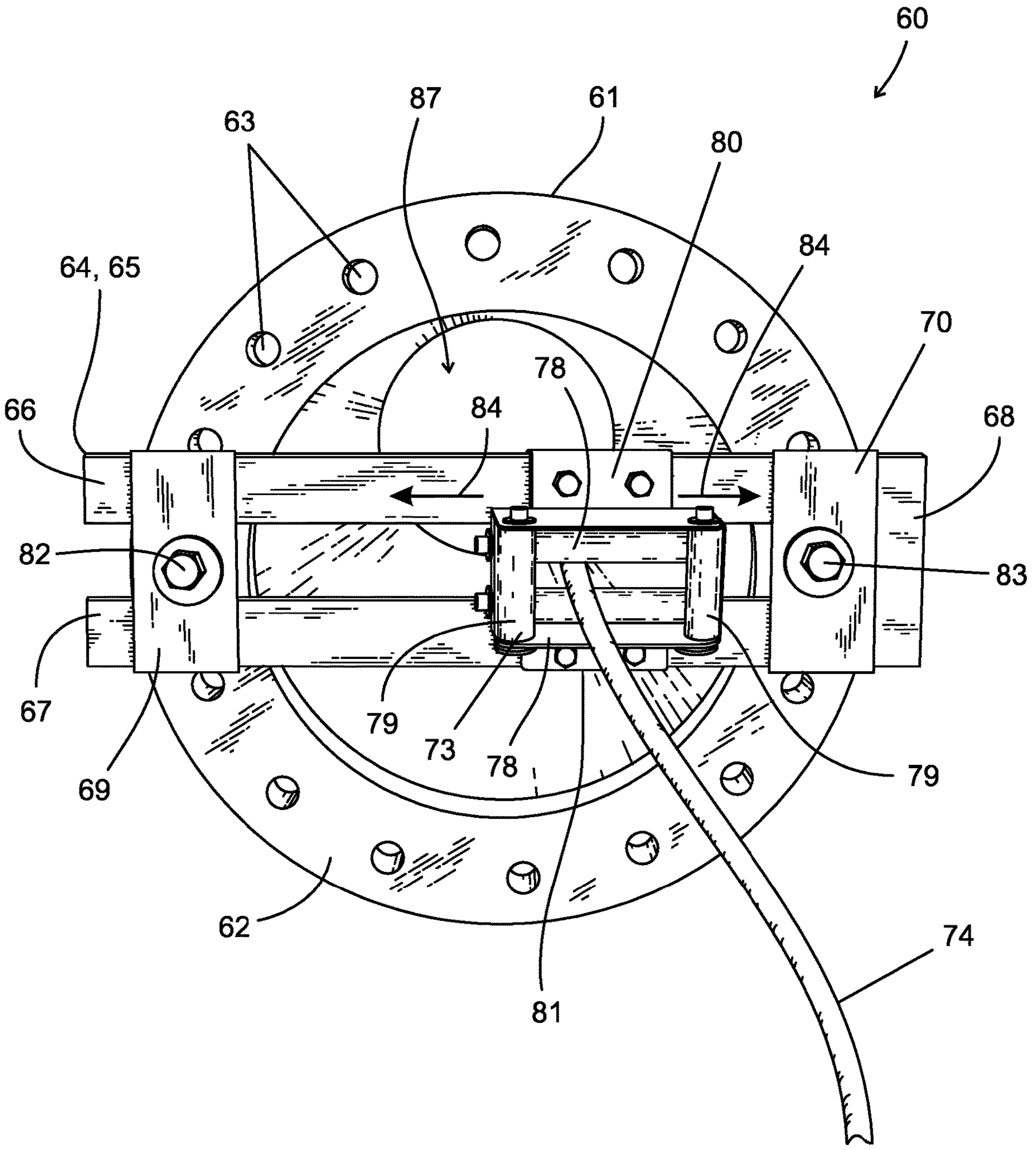
FIG. 9 is a front view of a preferred embodiment of the back out preventer of the present invention.
Figure 10:
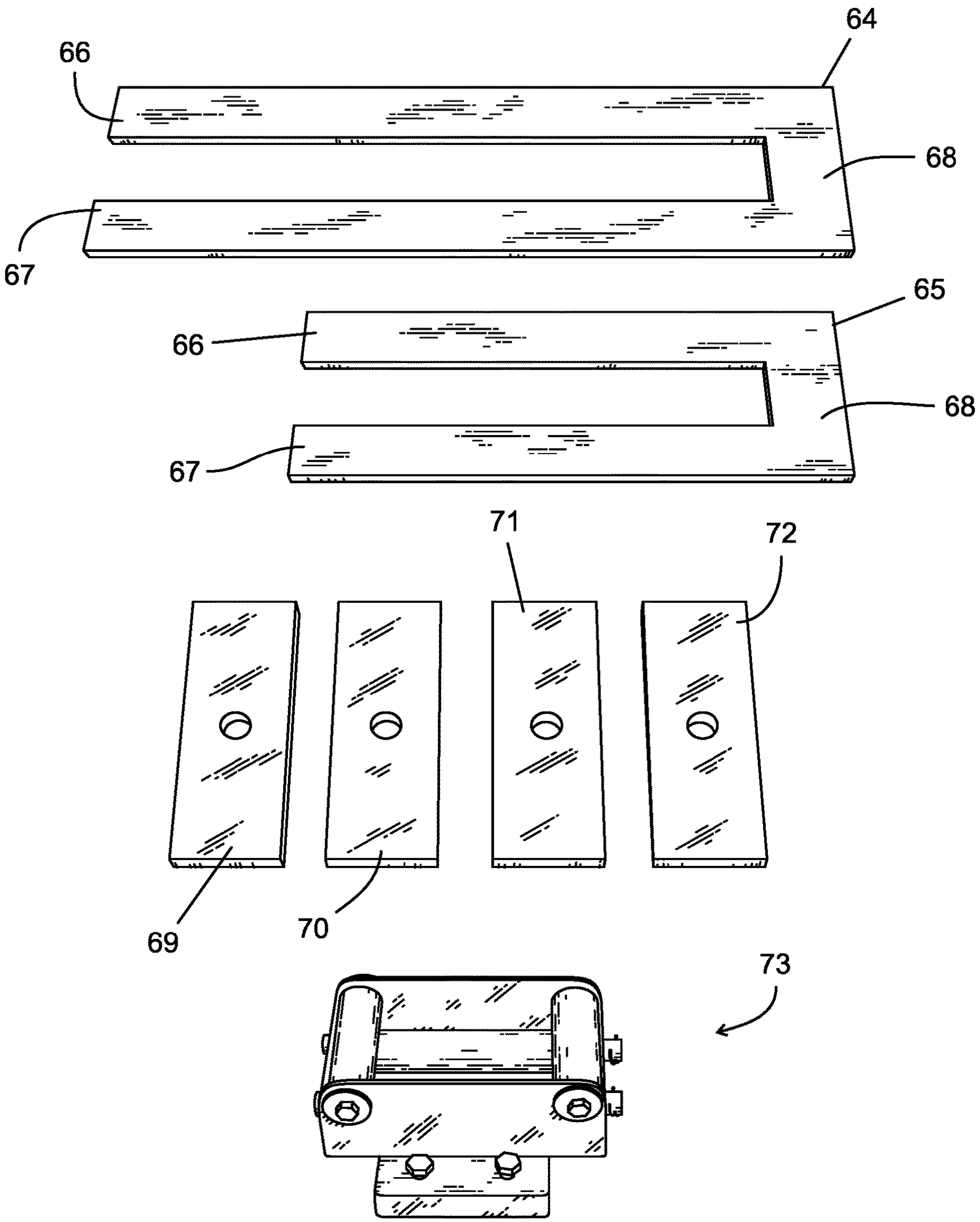
FIG. 10 is an exploded view illustrating components of the back out preventer of FIG. 9.
Figure 11:
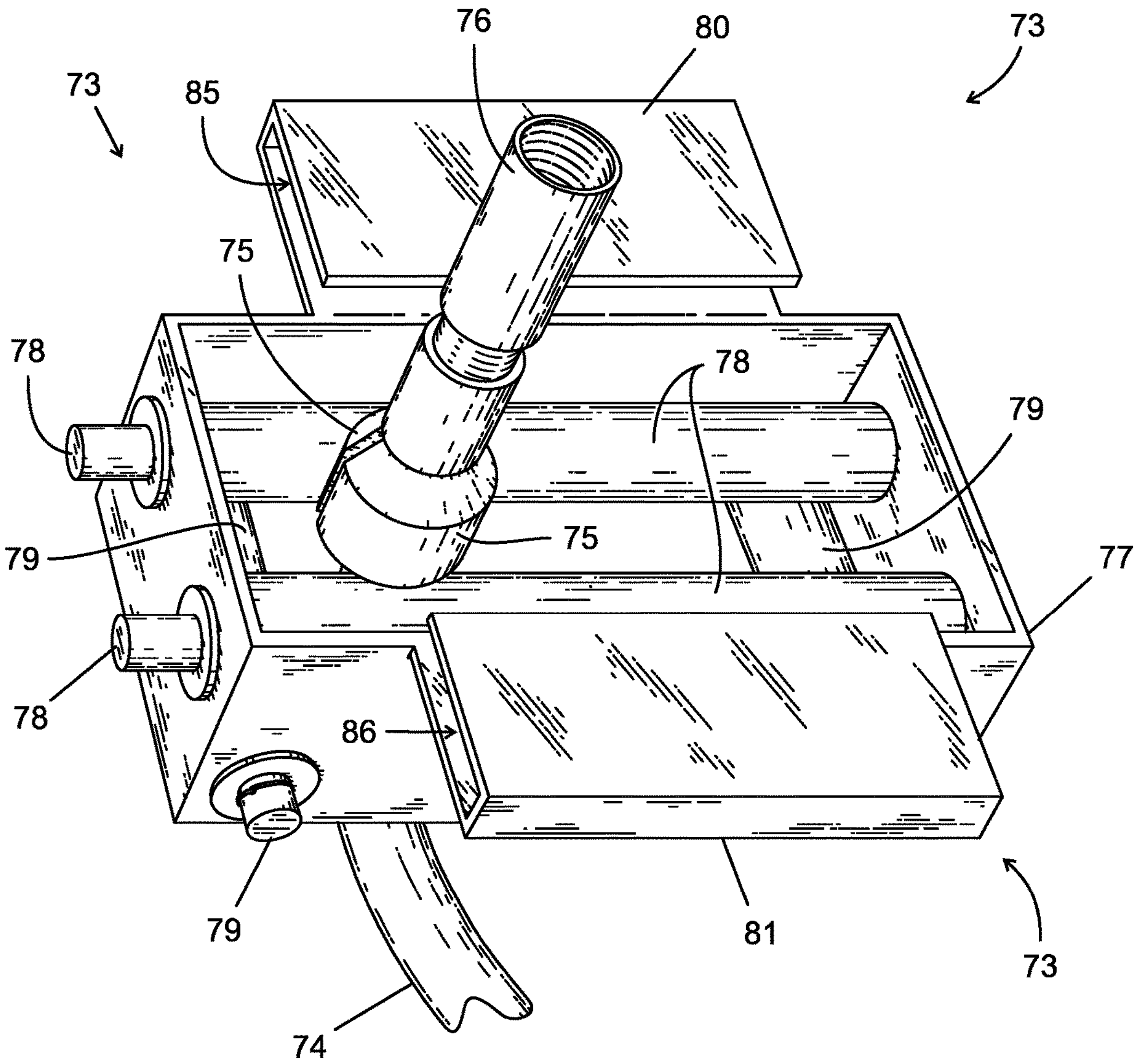
FIG. 11 is partial perspective view of a preferred embodiment of the back out preventer of FIG. 9.

A back up preventer or hose and pressure washing tool retainer 60 can be seen in FIGS. 9-11. The preventer or retainer 60 attaches to riser 11 having an attached annular flange or to a pipe 61 or other adapter having an annular flange 62. Flange 62 can be a weld neck type annular flange having a plurality of bolt circle openings 63, each receptive of a bolted connection (not shown) that enables the pipe or riser 61 and flange 62 to be connected to another pipe/riser and flange 62 or other pipe spool or other equipment. The apparatus 60 can be used in concert with the cleaning of a riser 11, connected to an annular flange 62 that is part of or connected to the riser 11.

In FIG. 9, bolted connections at 82, 83 hold a selected plate 69 or 70 to annular flange 62 wherein each bolted connection 82, 83 includes a bolt that extends through a bolt circle opening 63 and connects with a nut. A washer can also be a part of bolted connection 82 or 83.

Bolted connections 82, 83 and fastener plates 69, 70, 71, 72 hold and support a mounting plate 64 or 65, each having longer flanges or plates 66, 67 connected with a shorter flange or plate 68.

Roller assembly 73 is mounted to a selected mount or plate 64 or 65 so that it can travel laterally as indicated by arrows 84 in FIG. 9. Roller assembly 73 includes roller frame 77 having upper and lower guides 80, 81. Each guide has a slot 85, 86 that is receptive of a larger flange or plate 66 or 67. Upper guide 80 has slot 85 that receives flange 66. Lower guide 81 has a slot 86 that receives flange 67.

Roller frame 77 has a pair of horizontal rollers 78 and a pair of vertical rollers 79. High pressure hose or lance line 74 is connected to a cleaning tool 48 that emits a high velocity, high pressure fluid stream (or streams) for cleaning the inside of pipe 61 or riser 11. Enlarged nut/enlarged annular fitting 75 (also known as "hose stop") is a "stop" attached to hose 74 next to coupling 76. Coupling 76 enables attachment to the cleaning tool (e.g., 48) that receives pressurized fluid from hose 74 and a high pressure pump. The nut or fitting 75 is too large to fit through the opening that is between a pair of horizontal rollers 78 or between a pair of vertical rollers 79 thus preventing escape of the cleaning tool 48, coupling 76 and hose 74 from the bore 87 of pipe 61.

FIGS. 12-28 show an additional embodiment of the apparatus of the present invention designated generally by the numeral 200. In FIGS. 12-28, riser cleaning system or riser cleaning apparatus 200 employs a specially configured cooling arrangement as part of the riser cleaning apparatus and method. The riser cleaning apparatus or system 200 would employ the high pressure lance and flow line 43, 74 of the preferred embodiment as well as the fittings, pumps and cleaning tools shown in FIGS. 1-11.

Figure 12:
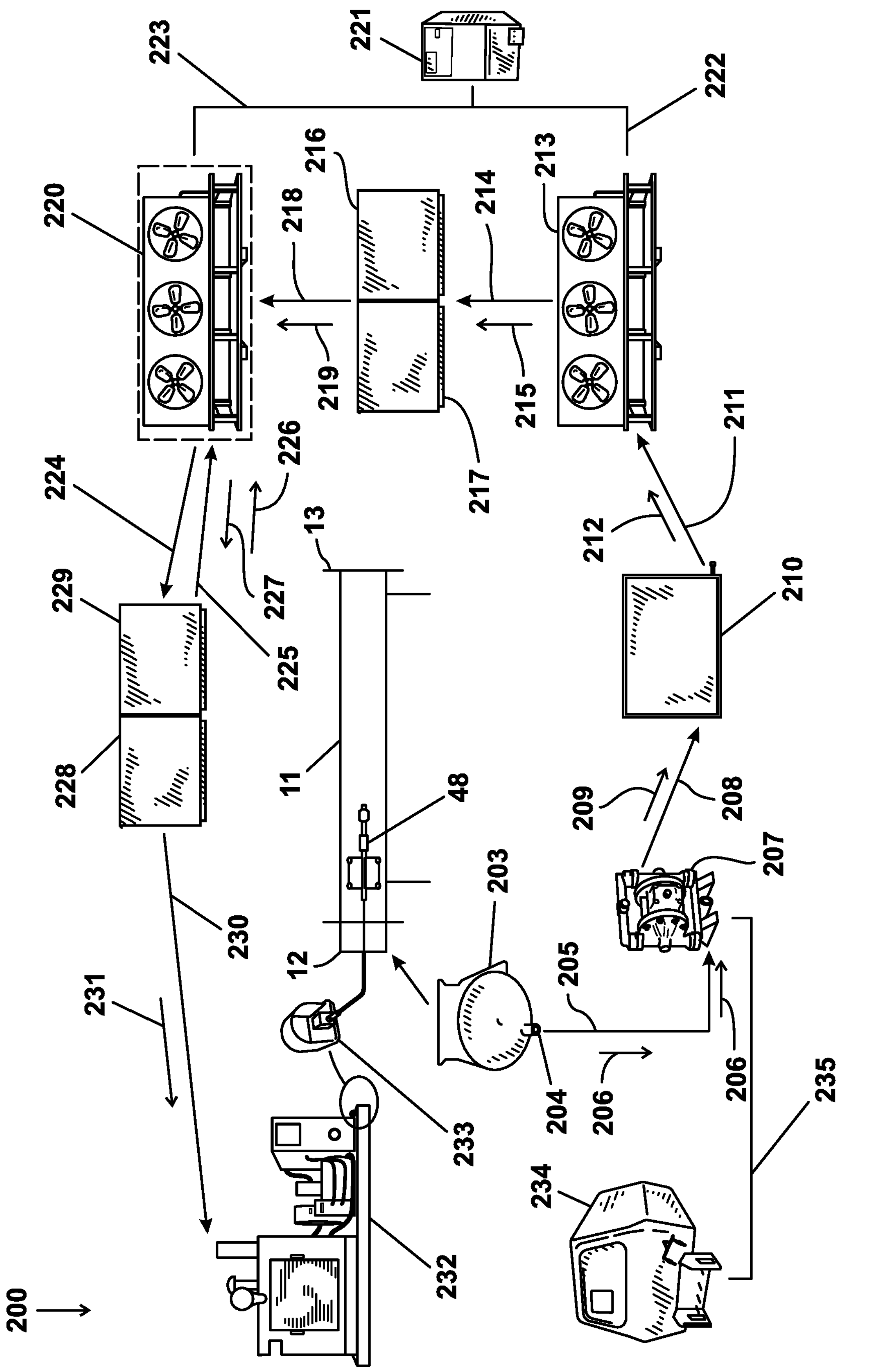
FIG. 12 is a schematic diagram of an additional embodiment of the apparatus of the present invention.

For example, the power washer 232 of FIG. 12 can employ a hose feed device 44 as seen in FIG. 2, hose 43, fittings, caps, shrouds 25, hose basket 170, back out preventer/hose and pressure washing tool retainer 60, and any other component of the embodiment of FIGS. 1-11.

In FIG. 12, riser 11 is shown as being cleaned with fittings or caps 203 at the riser ends (e.g. end 12 and/or 13), each having one or more drain outlets or fittings 204. Cleaning tool 48 would be inserted through a fitting or cap 203 and into the riser section 11 for cleaning the same as was described more fully with respect to FIGS. 1-11.

A foot pedal or other suitable control 233 such as an air-operated toggle switch can be used to control the feed of hose 43 from a reel or hose feed device 44. Pressurized fluid is provided to cleaning tool 48 by high pressure pump/power washer 232. Fluid that has been used to clean the inside surfaces of riser assembly 11 is discharged via gravity flow through cap 203 and drain 204 to a flow line 205 as illustrated by arrows 206 in FIG. 12. A pump 207 such as a diaphragm pump can be powered with pneumatics supplied by air flow line 235 and compressor 234 in FIG. 12. A discharged flow of spent, dirty fluid in lines 205, 208 enters a receptacle, tank or cut box 210 (arrow 209) and then is discharged to flow line 211 as illustrated by arrow 212.

Fluid discharged from riser section 11 and cap 203, drain fitting 204 is typically very hot such as for example between about 100 and 150° F. or more specifically, between about 120 and 170° F. If such water recirculated directly to the high pressure pump portion of power washer 232, the elevated temperature could cause damage to the pump. In order to recirculate and reuse the fluid that is used in cleaning of riser assembly 11, the present invention provides an improved system that returns cooled cleaning fluid to the power washer 232 such as for example between about 50 and 80° F. or more particularly between about 50 and 75° F.

A first cooling unit or heat exchanger 213 can be a system that employs multiple fans and cooling coils. Heat exchanger 213 is receptive of the flow that exits tank 210 and travels via line 211 (arrow 212). Flow then travels via line 214 to tanks 216, 217 as illustrated by arrow 215 in FIG. 12. The tanks 216, 217 can be connected in order to maintain a relatively uniform fluid temperature. Fluid exiting the tanks 216, 217 travels via line 218 (arrow 219) to second heat exchanger 220 which is a refrigerated chiller. Arrow 219 in FIG. 12 illustrates the transfer of fluid from tanks 216, 217 to the heat exchanger 220 where the cleaning fluid is cooled with a refrigeration system that employs a coolant such as Freon or other commercial refrigerant.

After exiting the heat exchanger 220, fluid can flow in both directions from heat exchanger 220 to tanks 228, 229 as illustrated by arrows 226, 227. Fluid can be recirculated to tanks 228, 229 via line 224 or back to heat exchanger 220 via line 225 as illustrated by arrow 226. Generator 221 can be provided to power heat exchangers 213, 220 via electrical lines 222, 223. Fluid exiting tanks 228, 229 flows in line 230 to power washer unit 232. This flow is illustrated by arrow 231 in FIG. 12.

Water exiting the riser assembly 11 and cap 203 via drain line 204 enters line 205. The line 205 can be equipped with one or more filters 236 which remove scale, particulate matter and the like from the volume of fluid that is used for cleaning.

The apparatus of the present invention and the method of the present invention 200 thus provides a riser cleaning system that can use a small volume of water such as for example about 900 gallons. More particularly, the present invention can employ a volume of cleaning fluid that is between about 700 and 900 gallons. This volume of cleaning fluid is recirculated and reused so that huge volumes of water that have been used in the prior art for cleaning of riser assemblies 11 is greatly reduced.

Figure 12A:
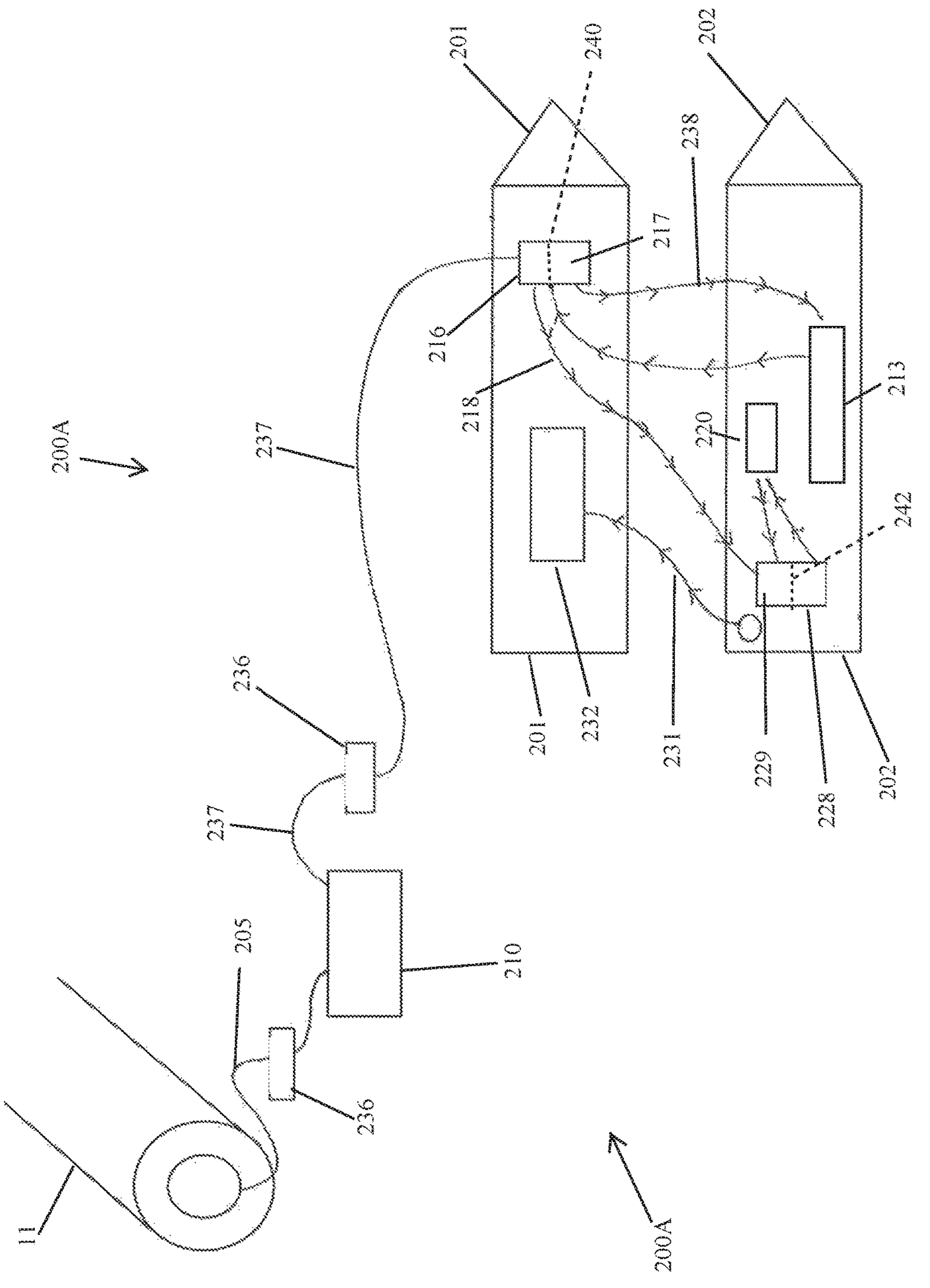
FIG. 12A is a schematic diagram of an additional embodiment of the apparatus of the present invention.
Figure 13:
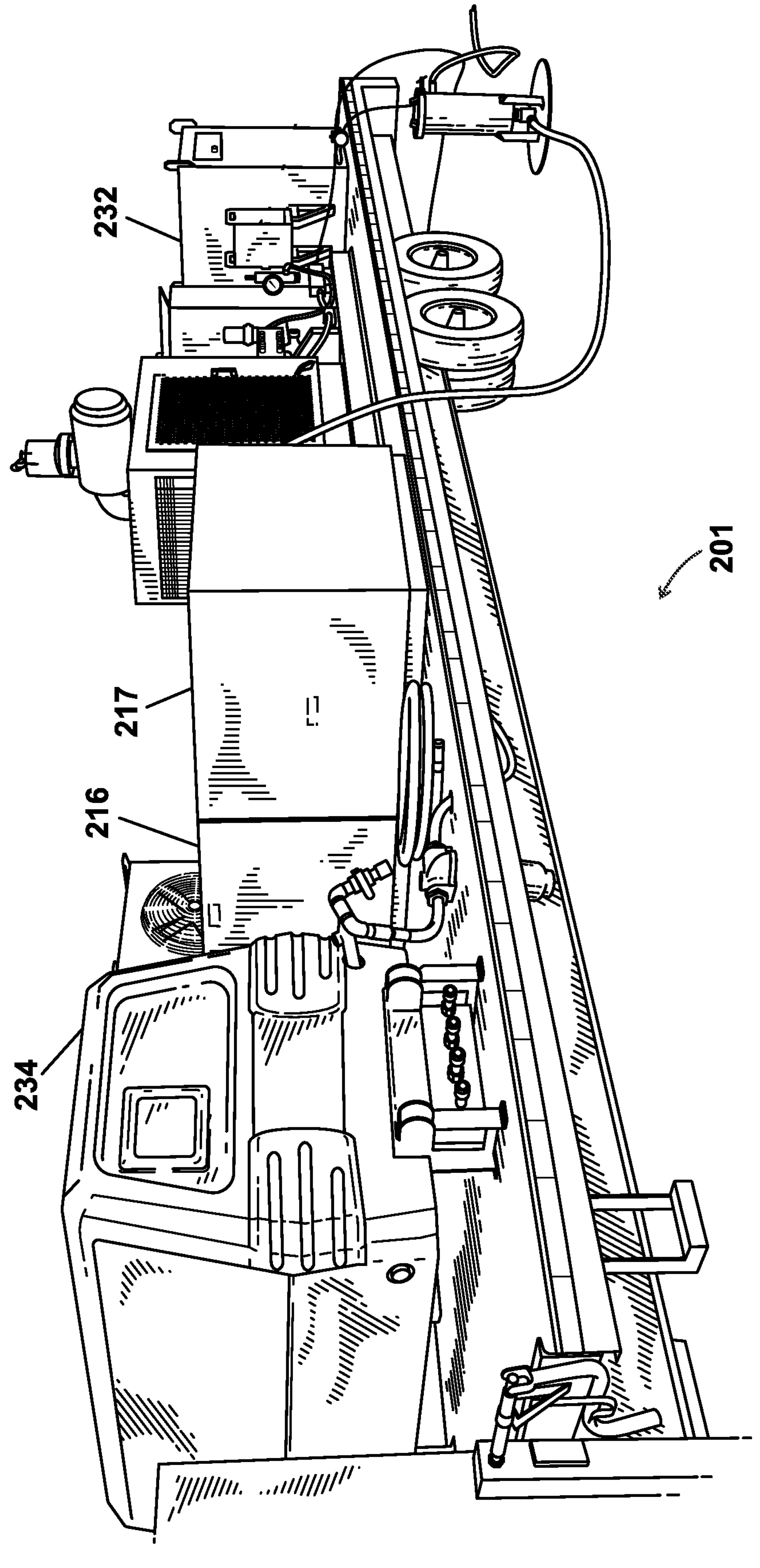
FIG. 13 is a partial perspective view of an alternate embodiment of the apparatus of the present invention.
Figure 14:
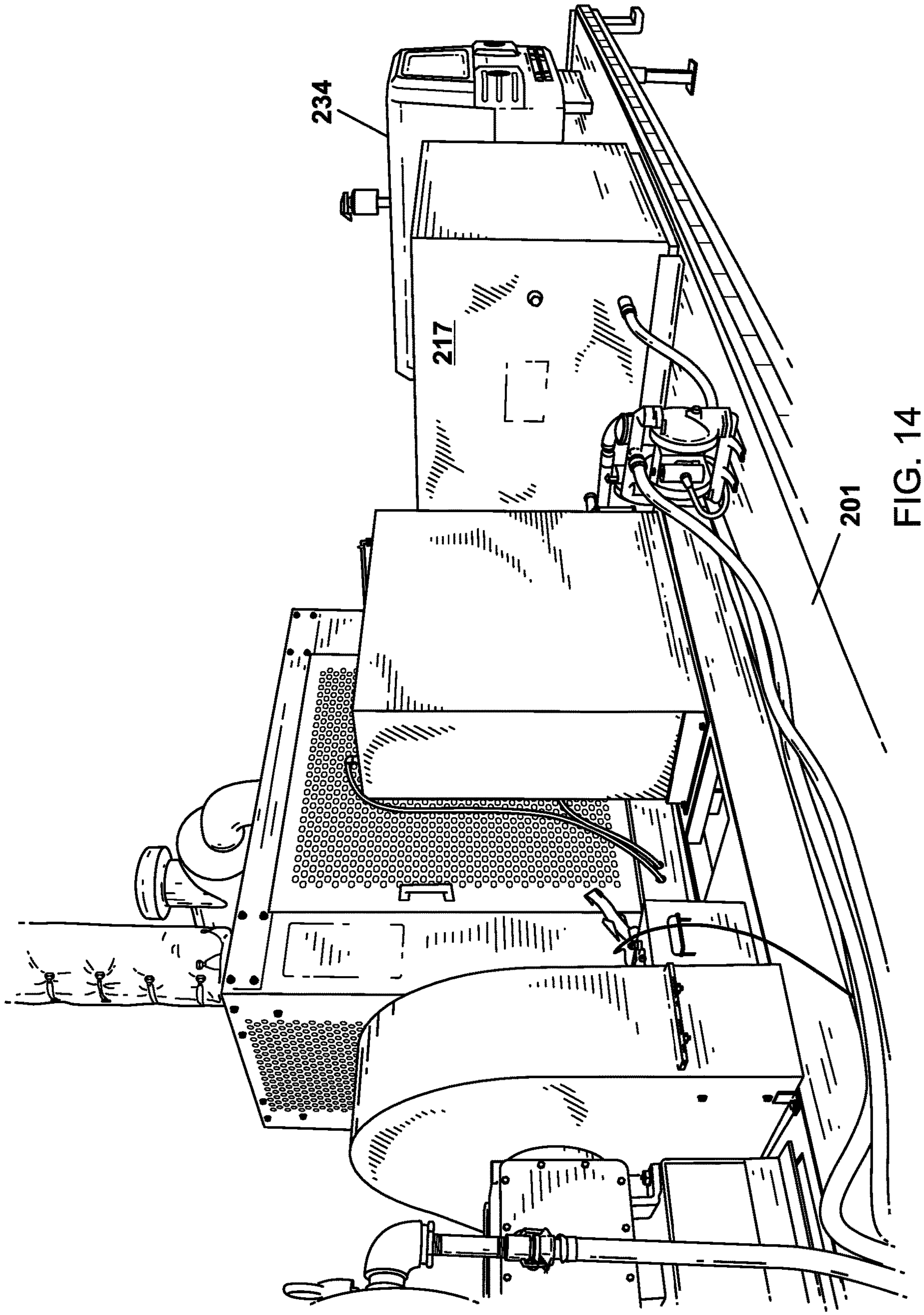
FIG. 14 is a partial perspective view of an alternate embodiment of the apparatus of the present invention.
Figure 15:
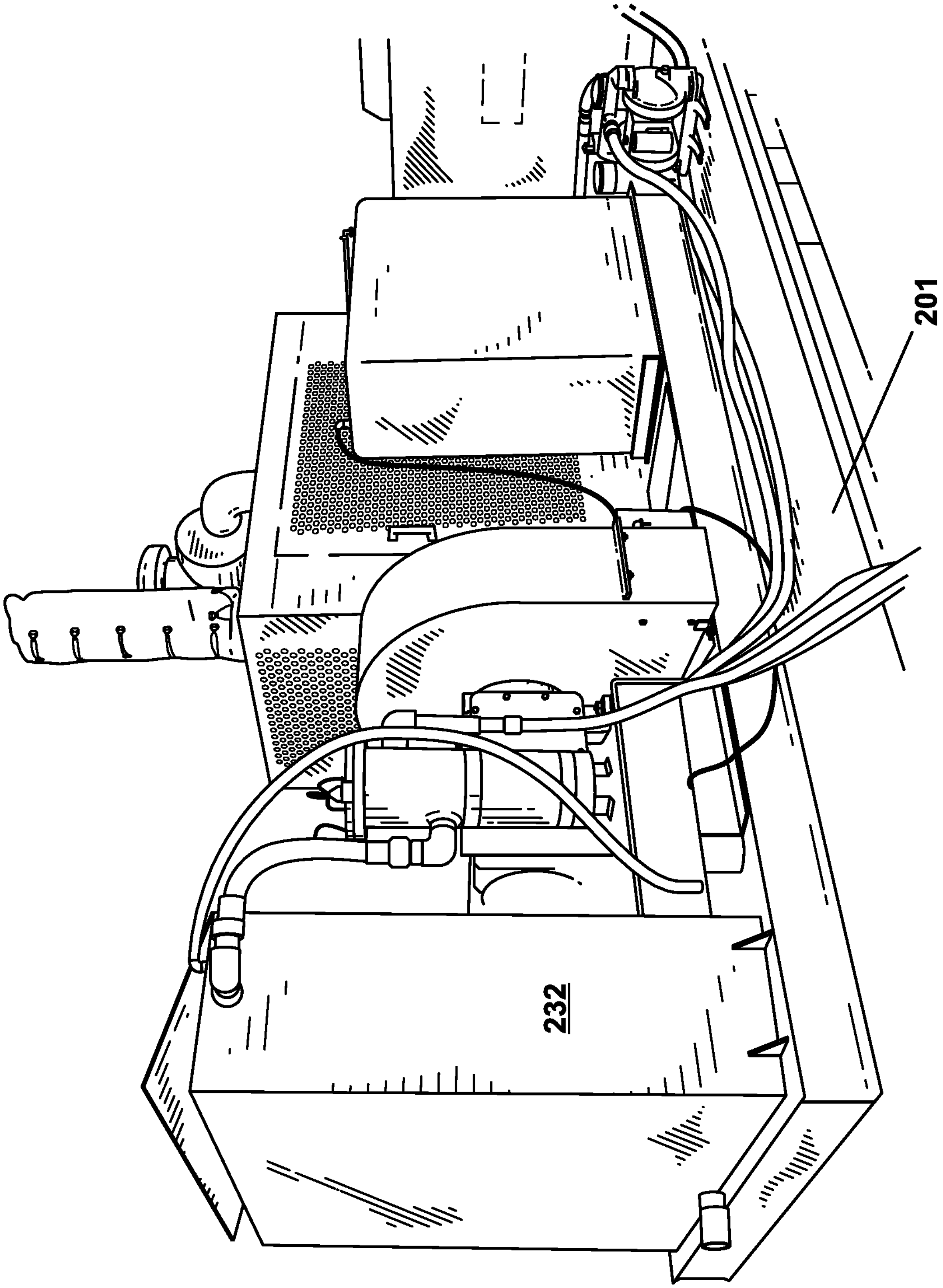
FIG. 15 is a partial perspective view of an alternate embodiment of the apparatus of the present invention.
Figure 16:
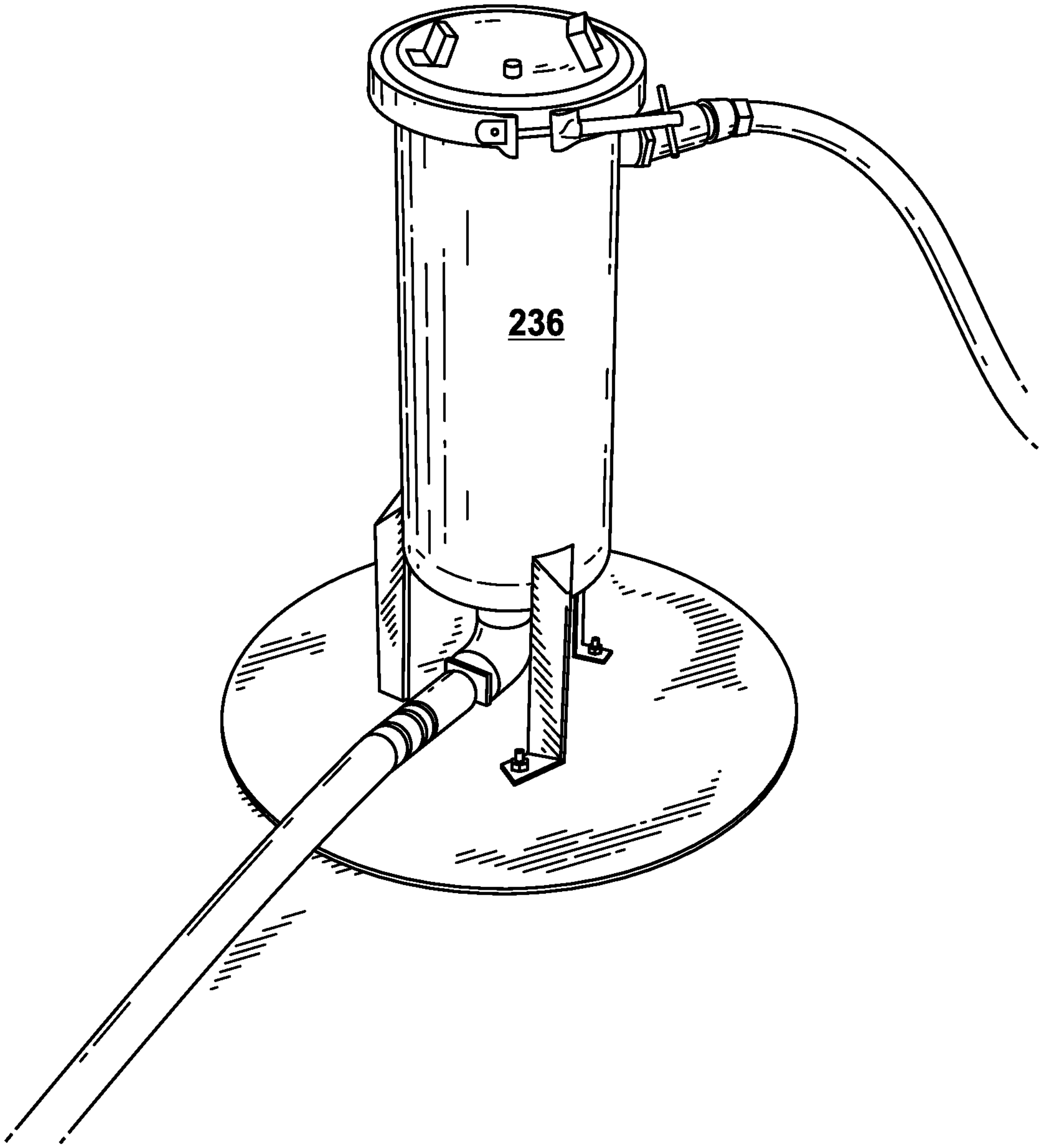
FIG. 16 is a partial perspective view of an alternate embodiment of the apparatus of the present invention.
Figure 17:
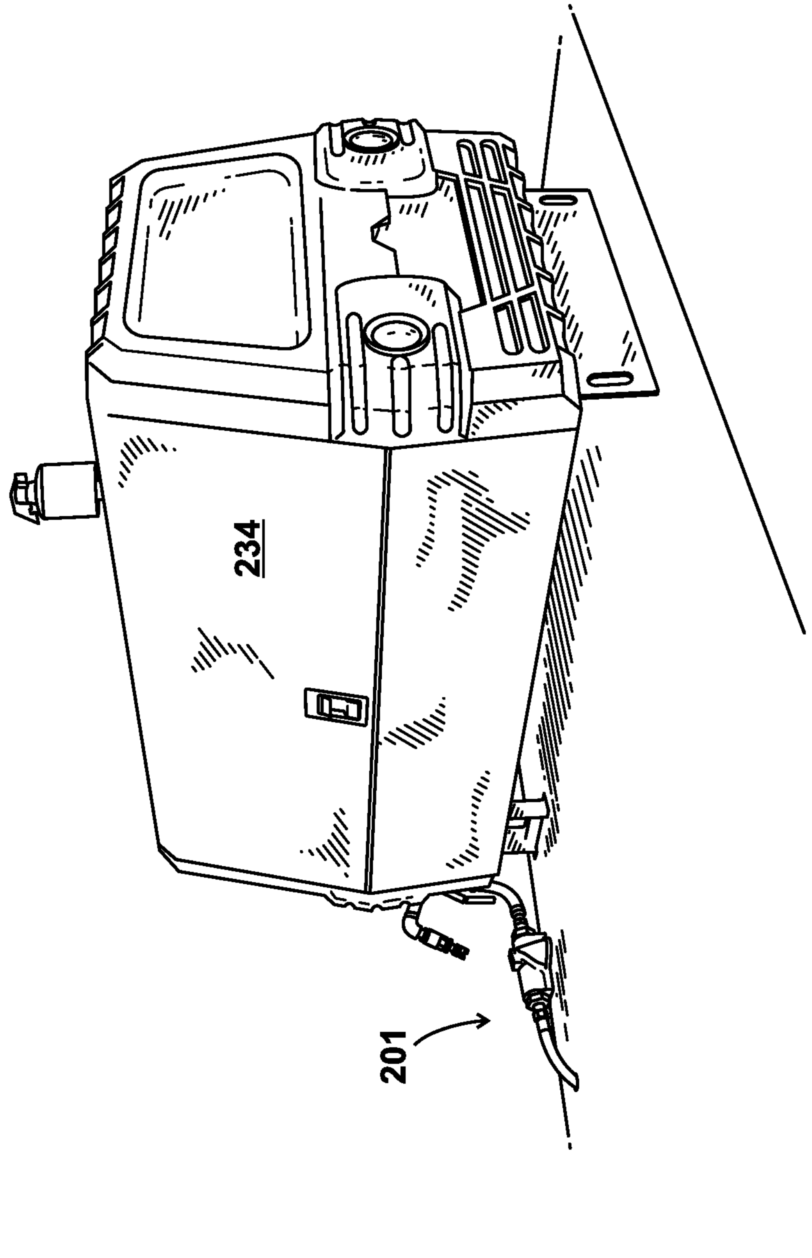
FIG. 17 is a partial perspective view of an alternate embodiment of the apparatus of the present invention.
Figure 18:
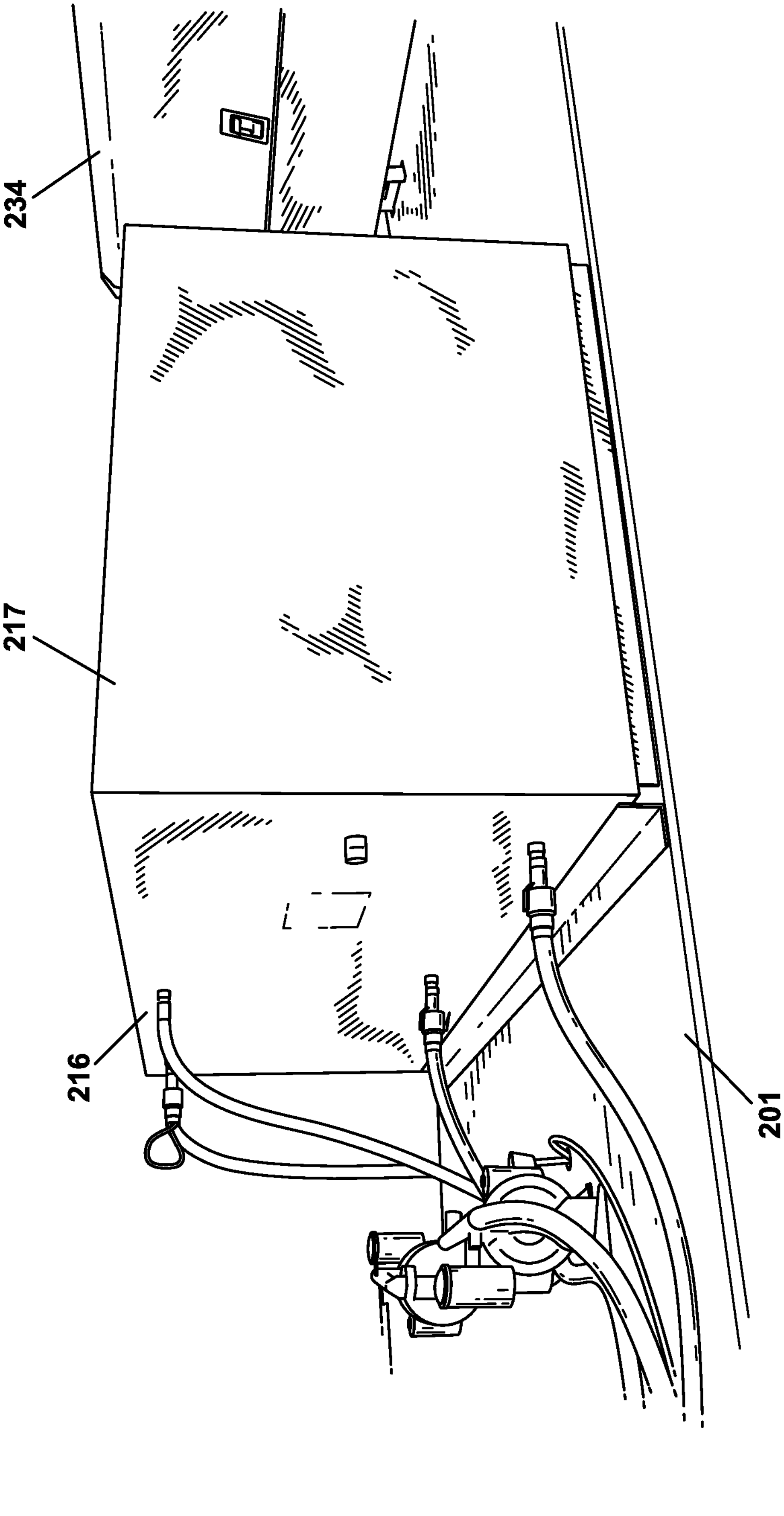
FIG. 18 is a partial perspective view of an alternate embodiment of the apparatus of the present invention.
Figure 19:
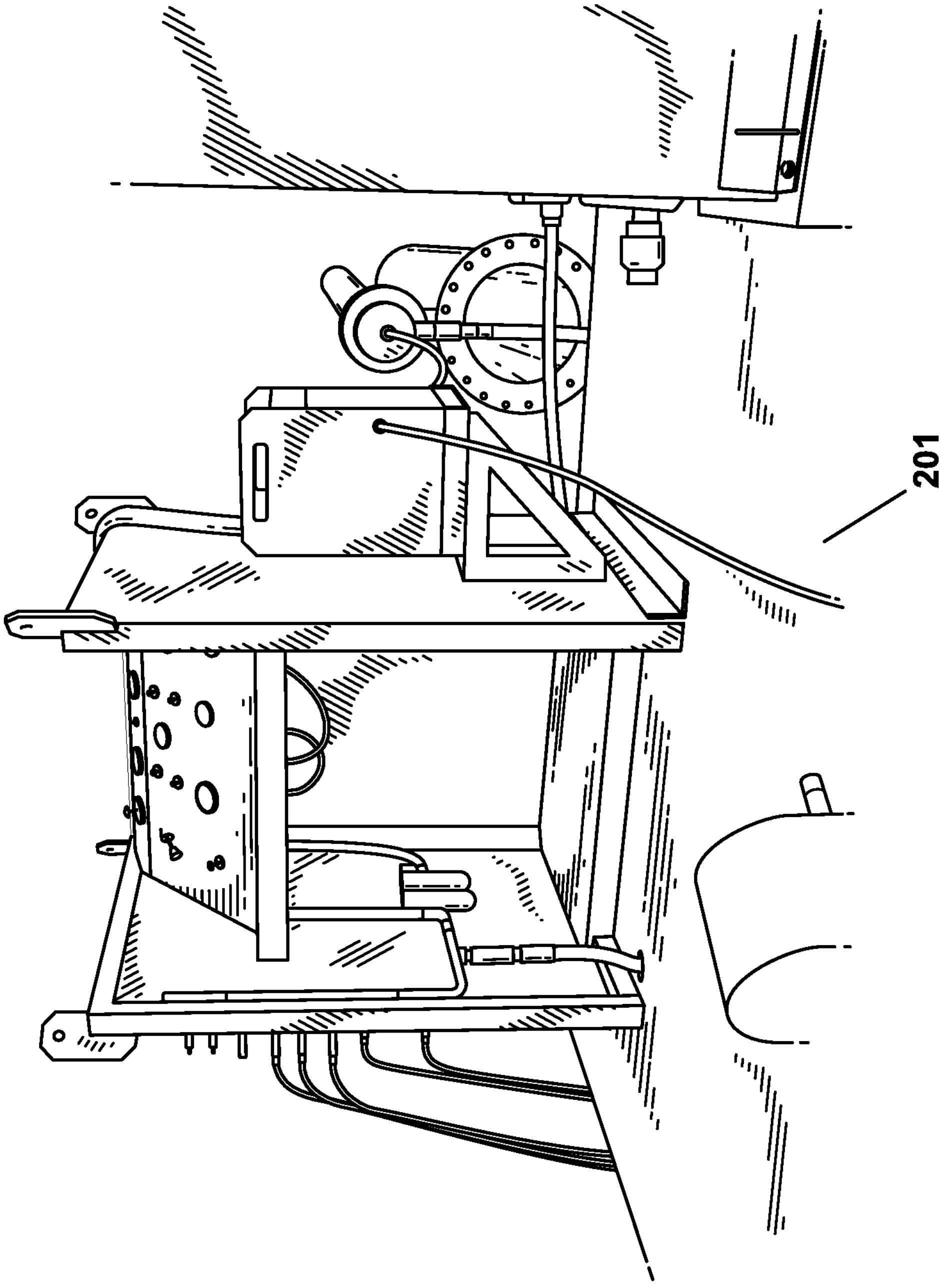
FIG. 19 is a partial perspective view of an alternate embodiment of the apparatus of the present invention.
Figure 20:
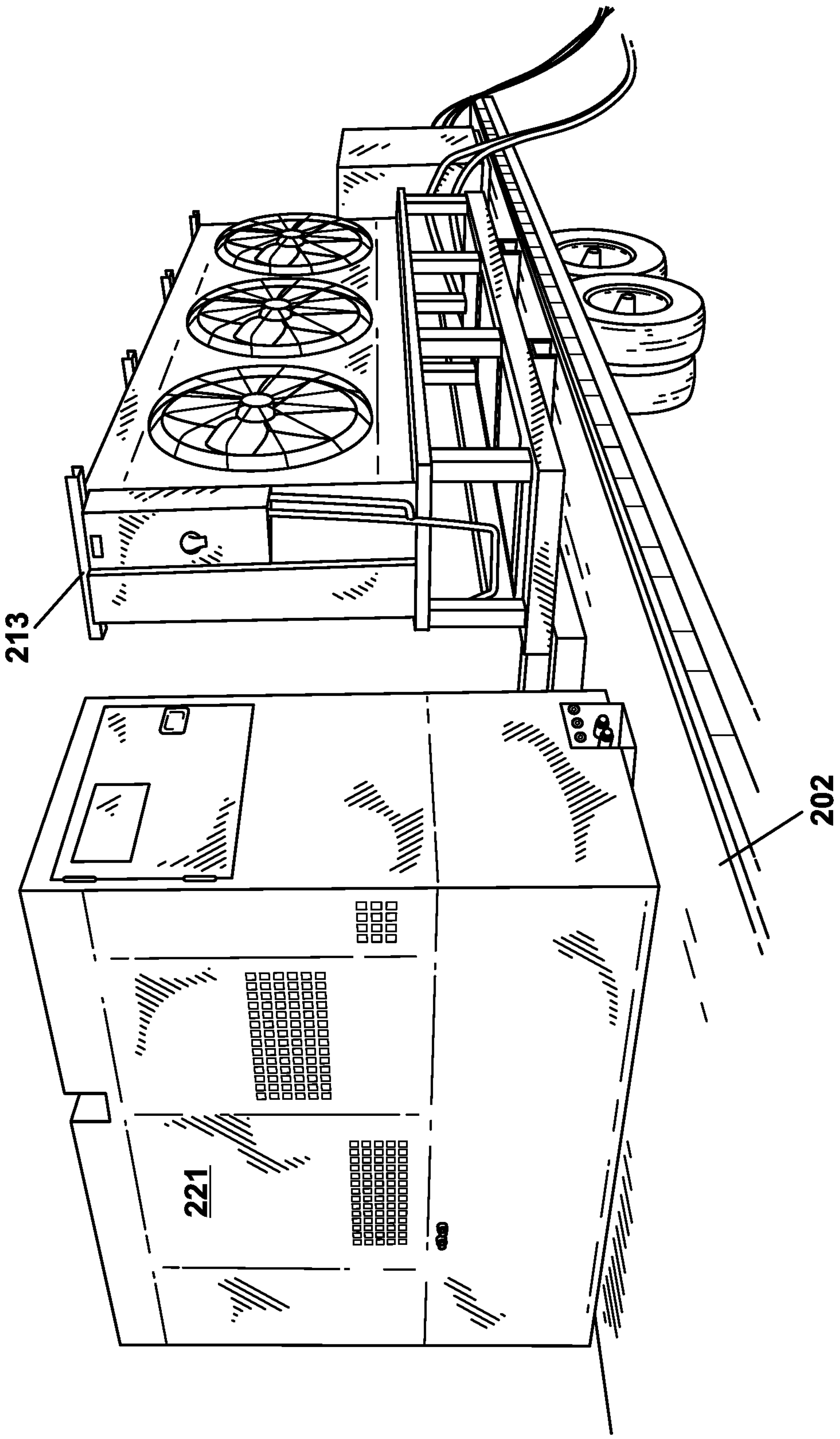
FIG. 20 is a partial perspective view of an alternate embodiment of the apparatus of the present invention.
Figure 21:
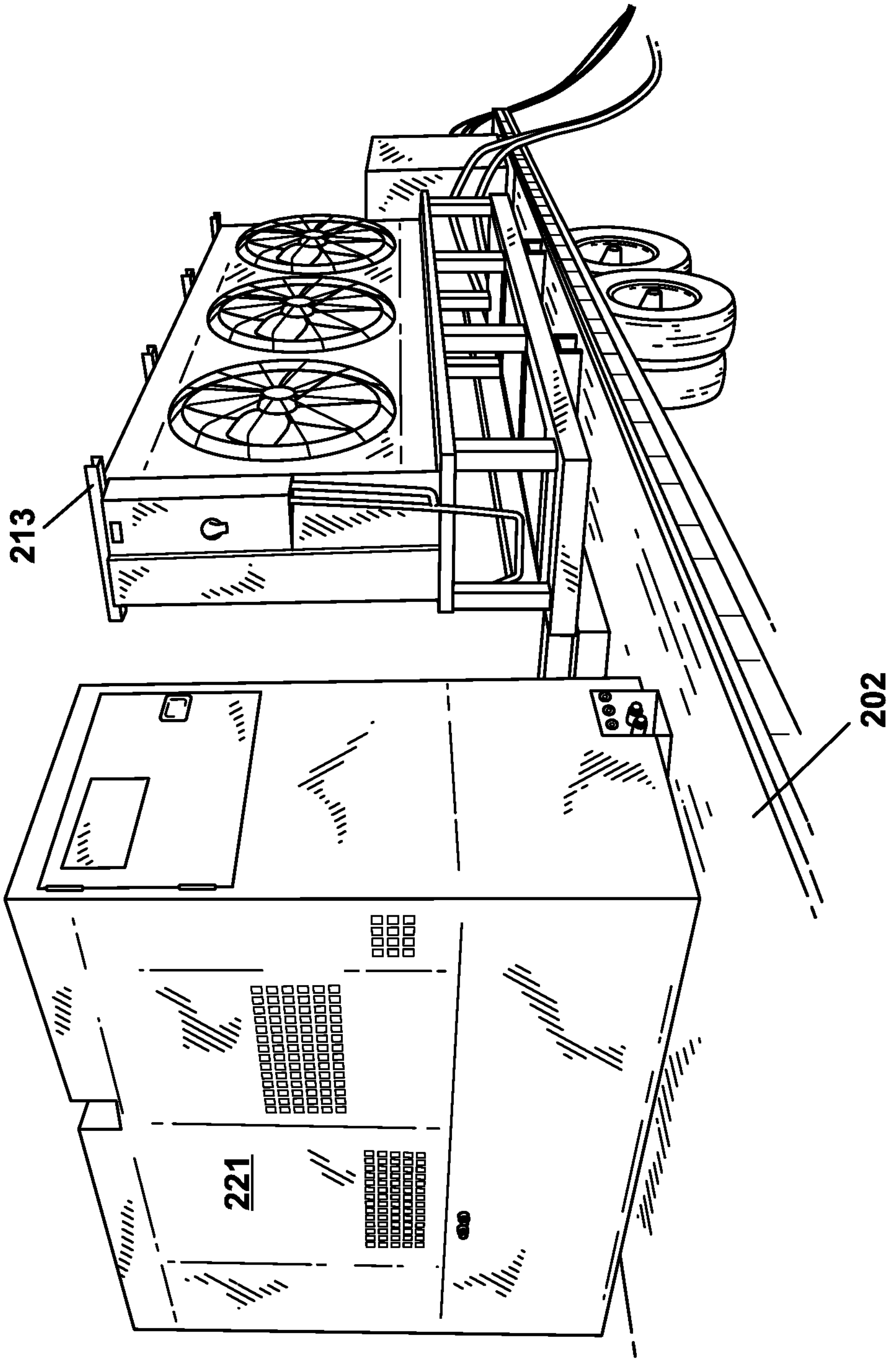
FIG. 21 is a partial perspective view of an alternate embodiment of the apparatus of the present invention.
Figure 22:
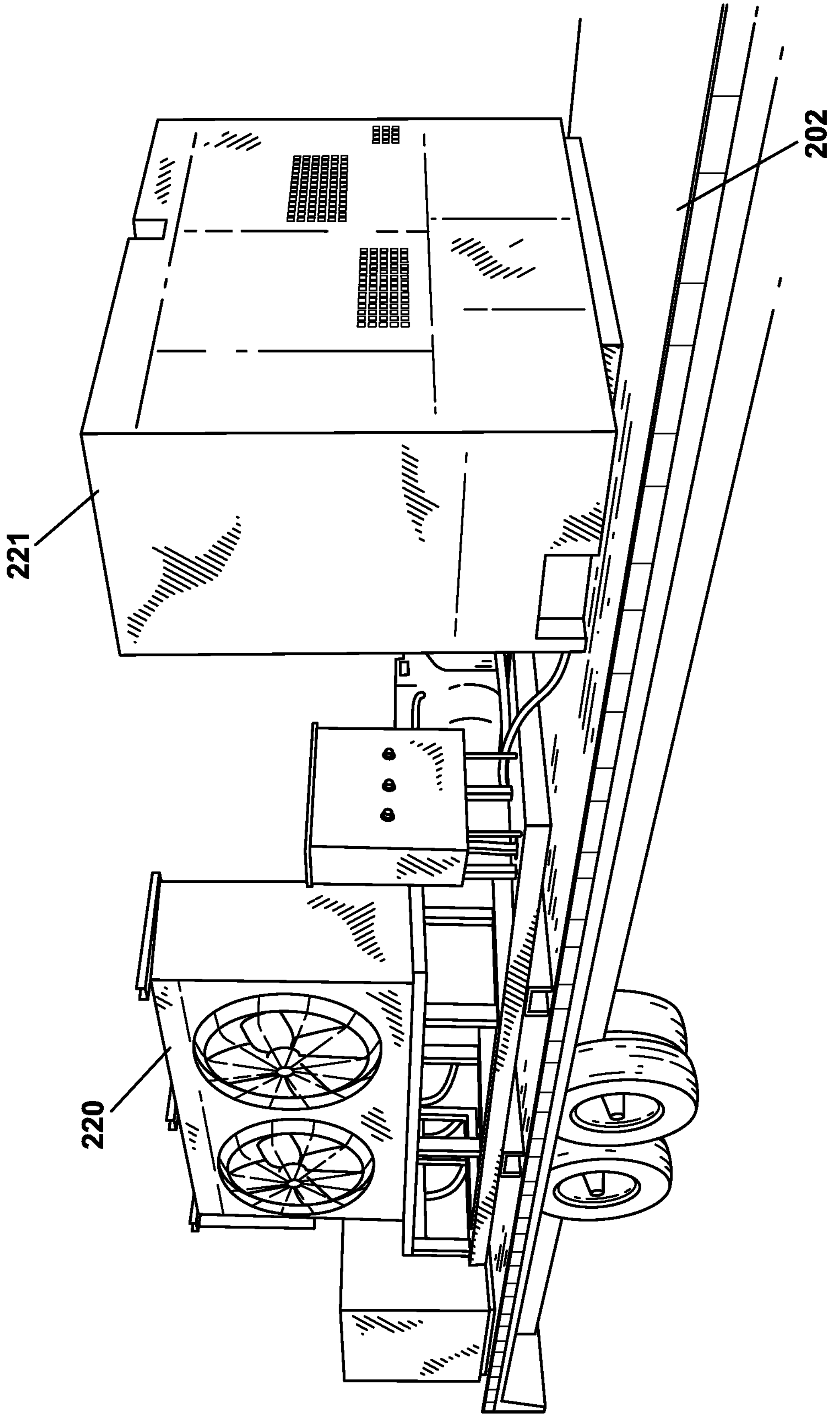
FIG. 22 is a partial perspective view of an alternate embodiment of the apparatus of the present invention
Figure 23:
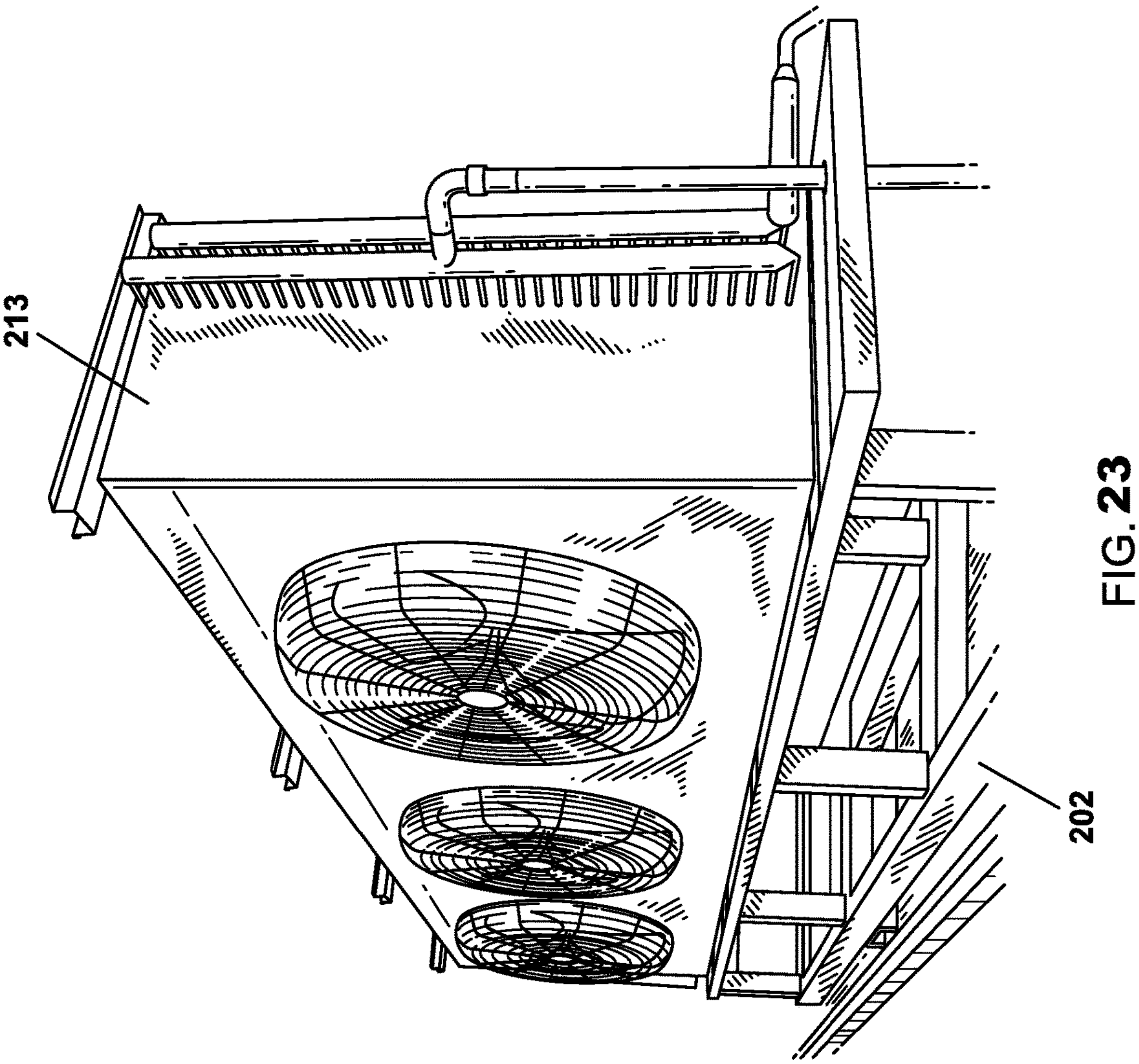
FIG. 23 is a partial perspective view of an alternate embodiment of the apparatus of the present invention.
Figure 24:
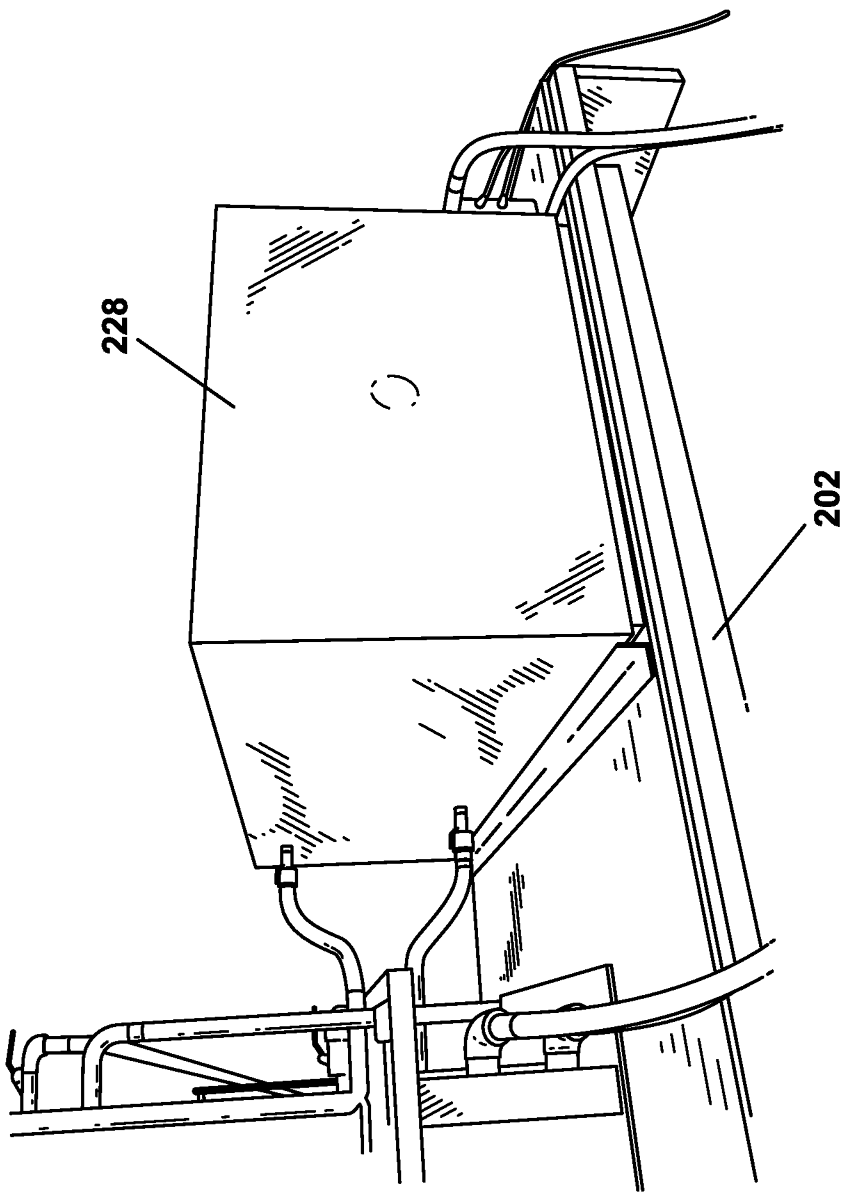
FIG. 24 is a partial perspective view of an alternate embodiment of the apparatus of the present invention.
Figure 25:
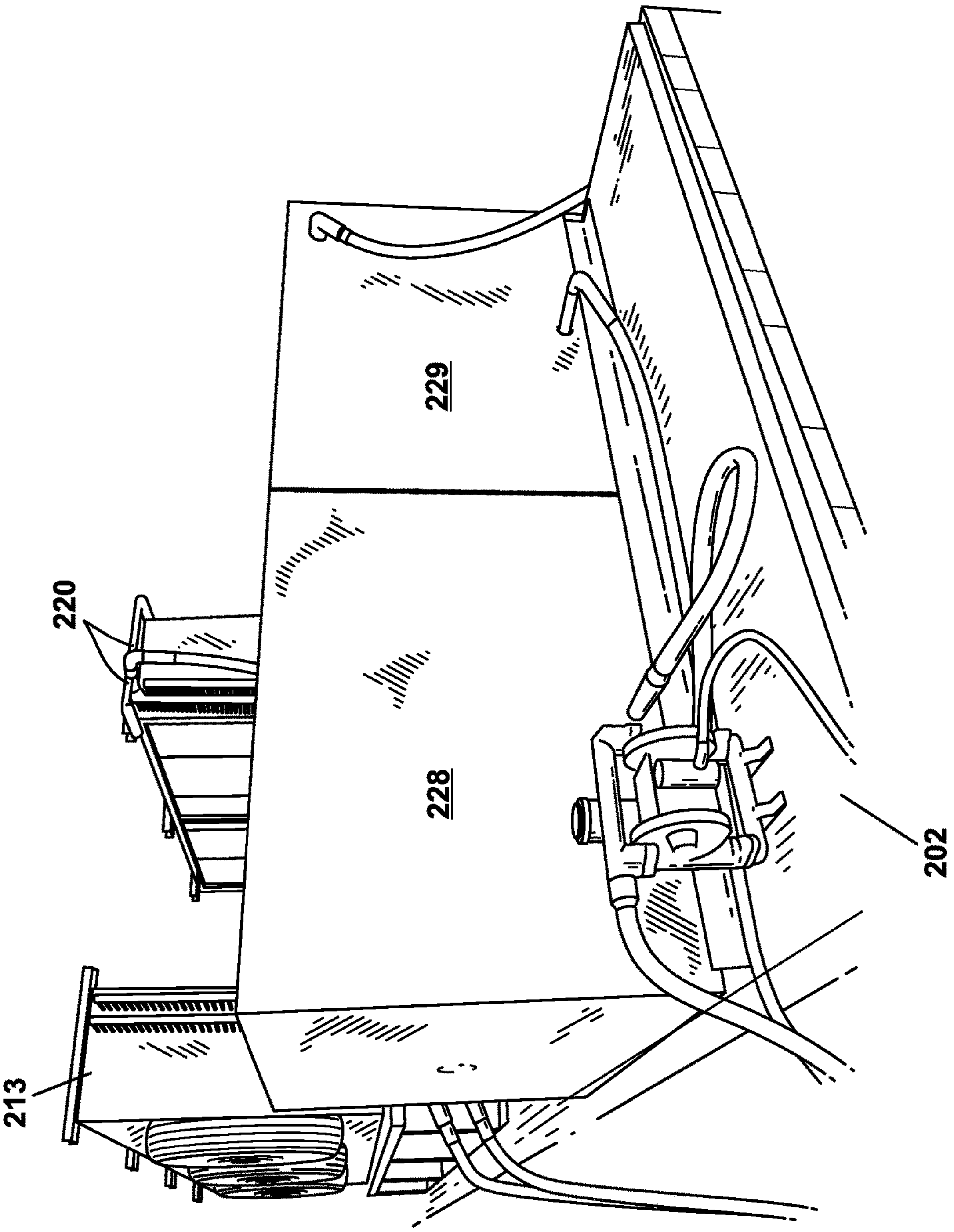
FIG. 25 is a partial perspective view of an alternate embodiment of the apparatus of the present invention.
Figure 26:
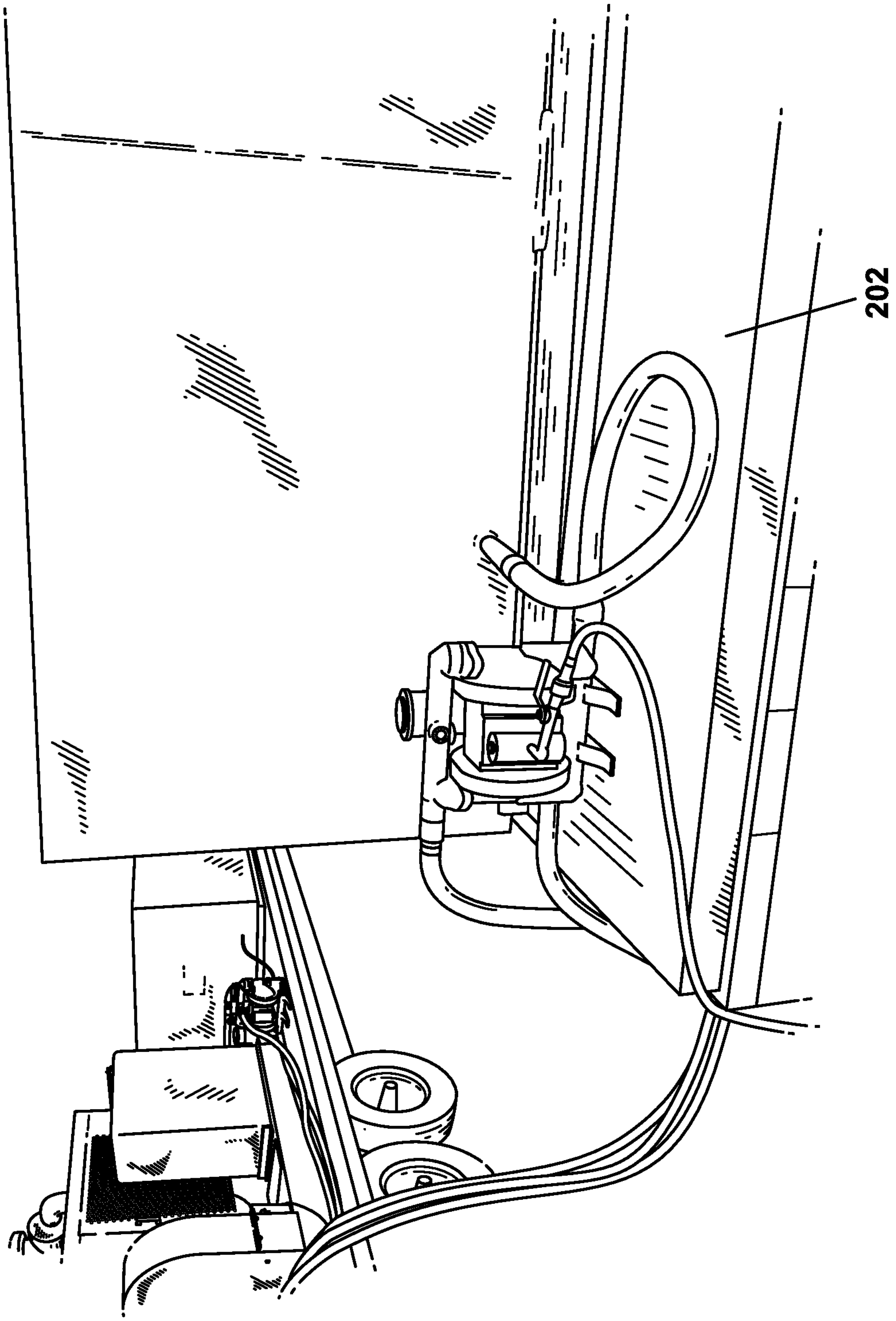
FIG. 26 is a partial perspective view of an alternate embodiment of the apparatus of the present invention.
Figure 27:
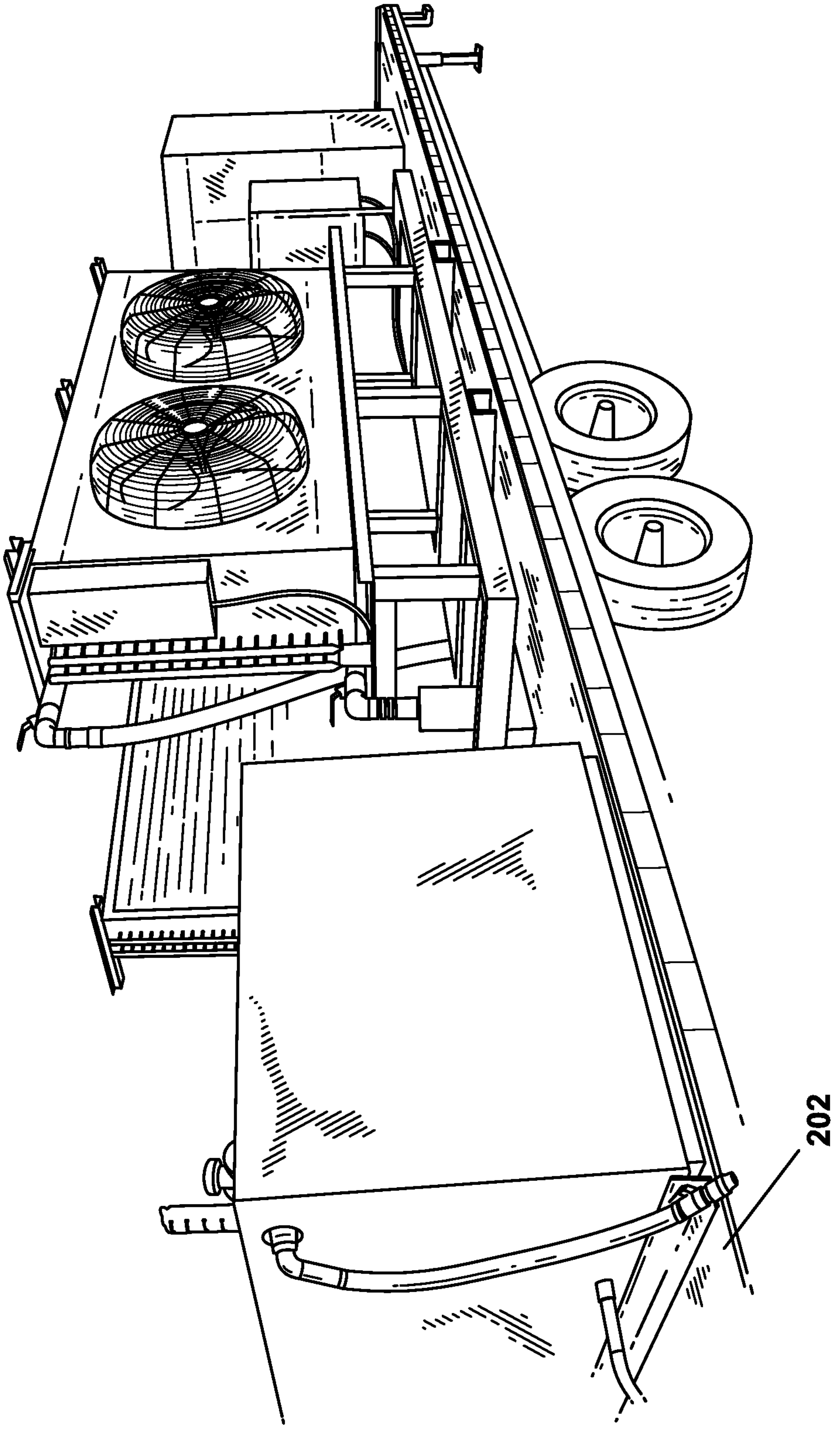
FIG. 27 is a partial perspective view of an alternate embodiment of the apparatus of the present invention.
Figure 28:
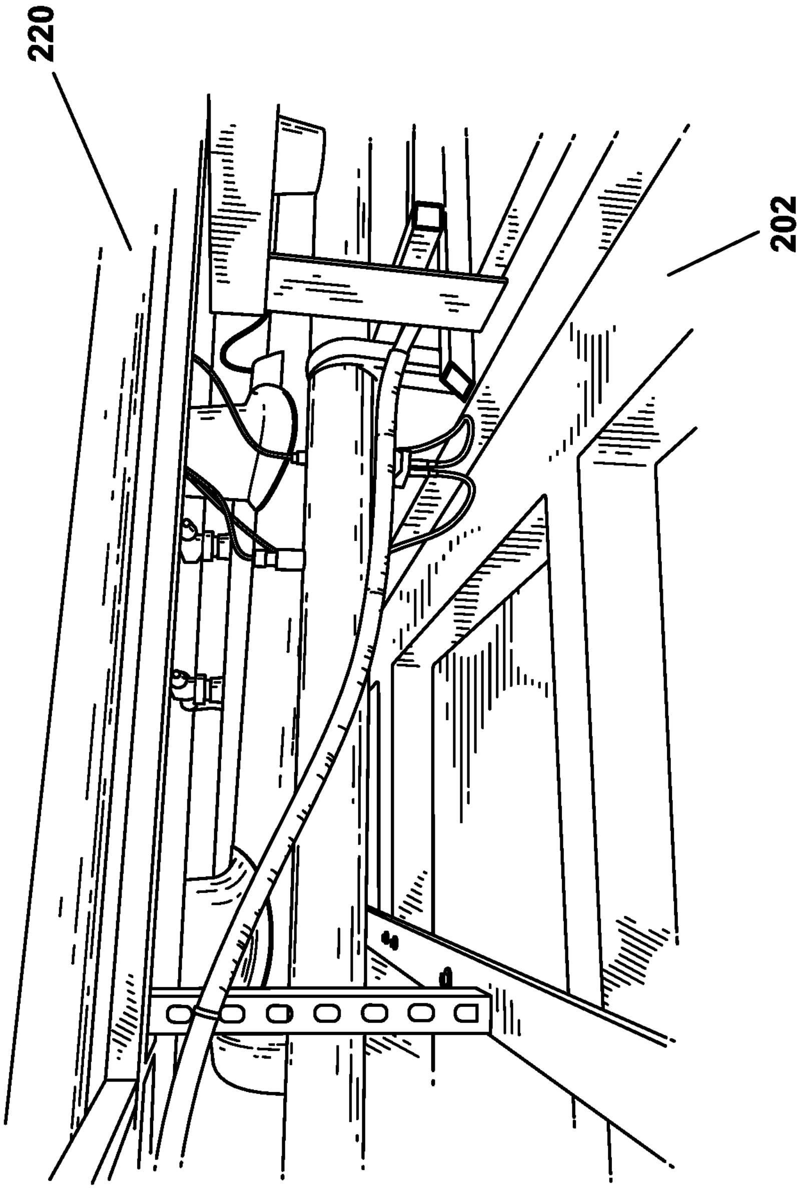
FIG. 28 is a partial perspective view of an alternate embodiment of the apparatus of the present invention.
Figure 29:
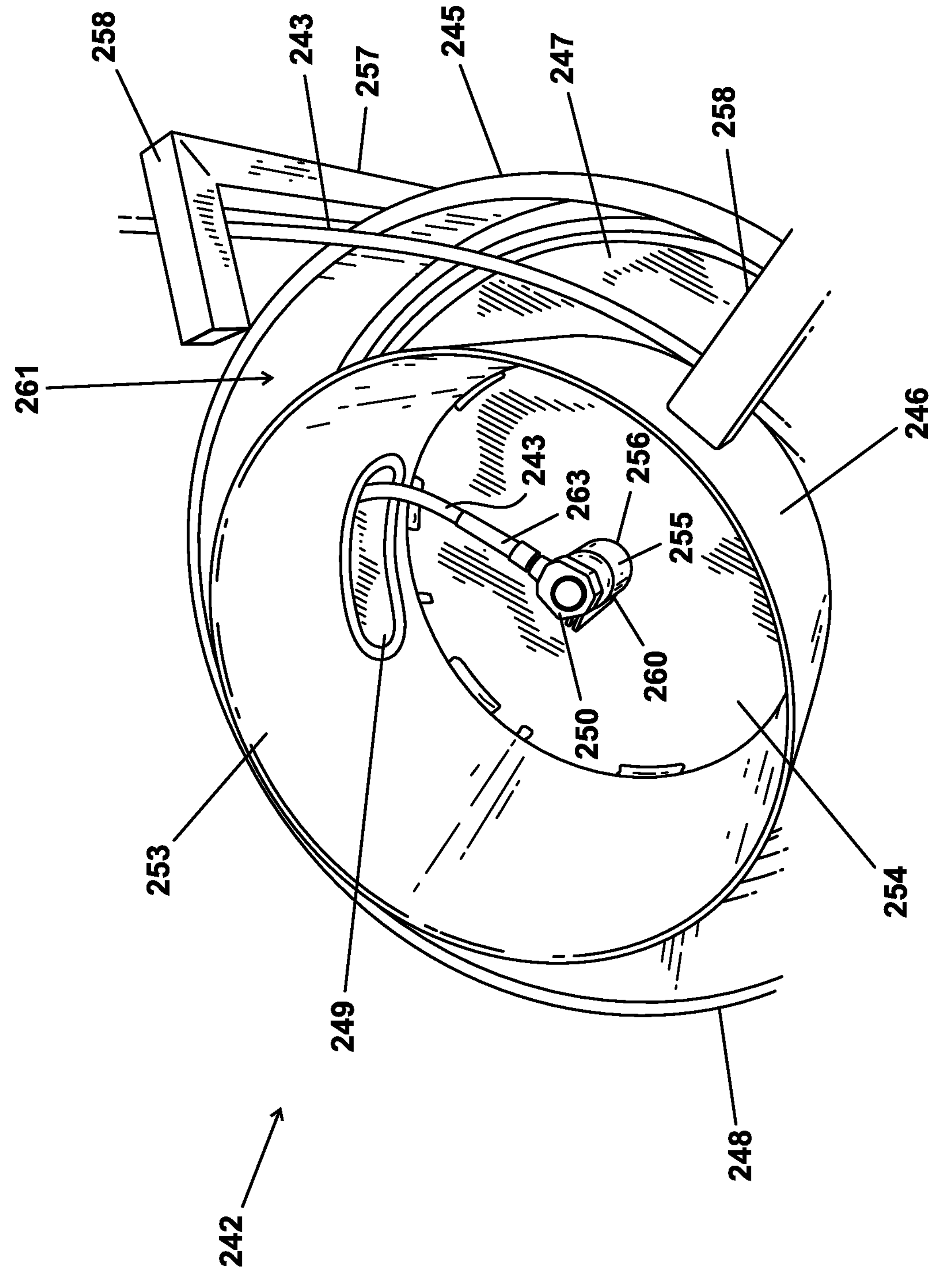
FIG. 29 is a partial perspective view of an alternate embodiment of the apparatus of the present invention.
Figure 30:
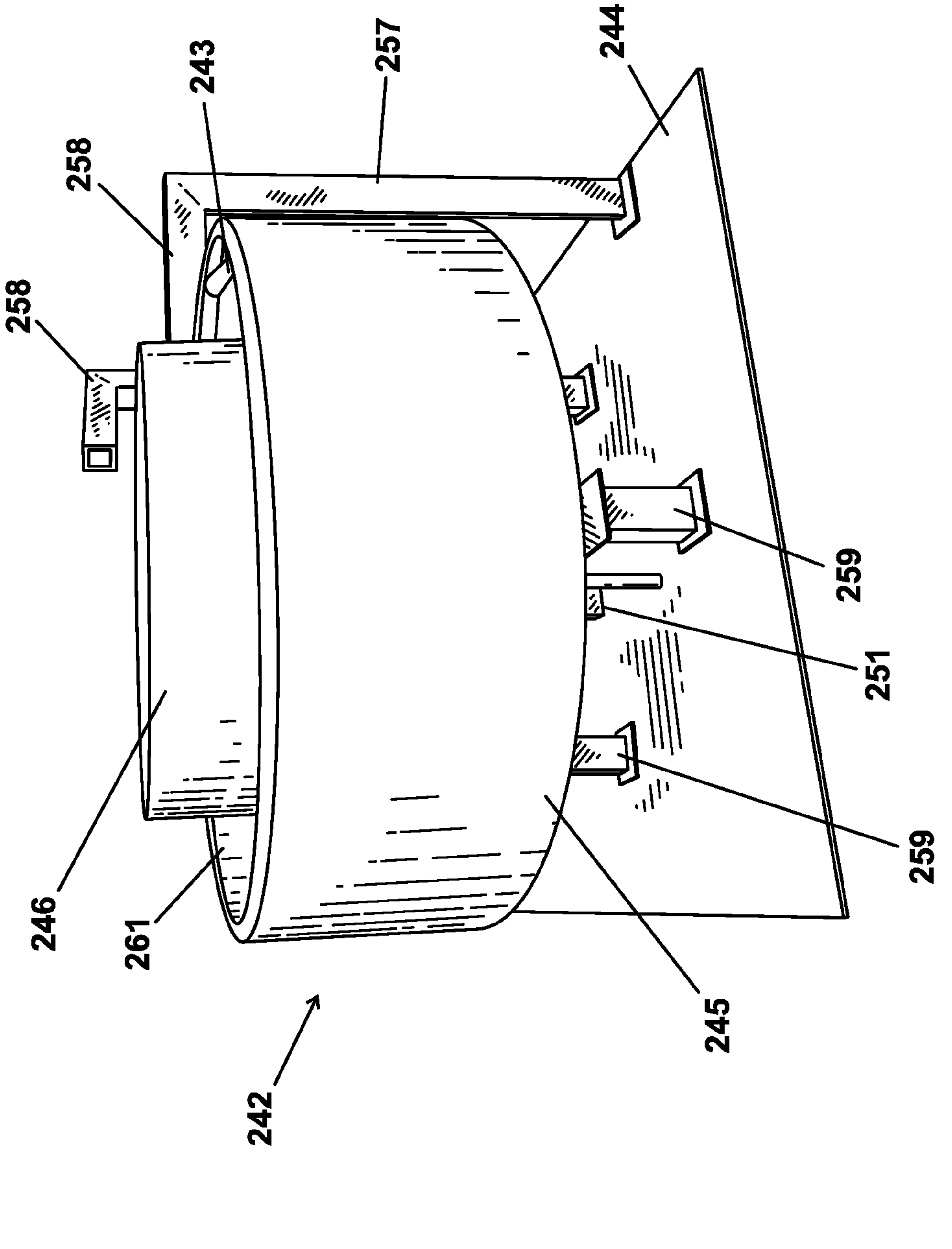
FIG. 30 is a partial perspective view of an alternate embodiment of the apparatus of the present invention.
Figure 31:
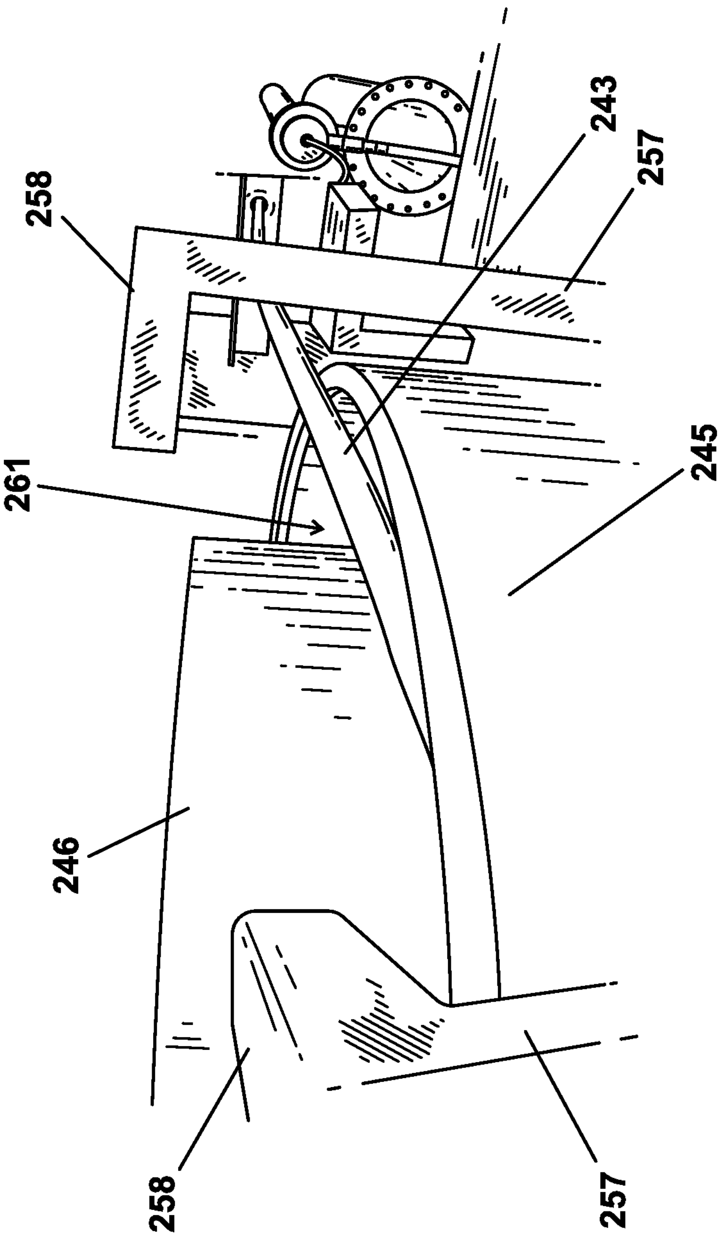
FIG. 31 is a partial perspective view of an alternate embodiment of the apparatus of the present invention.
Figure 33:
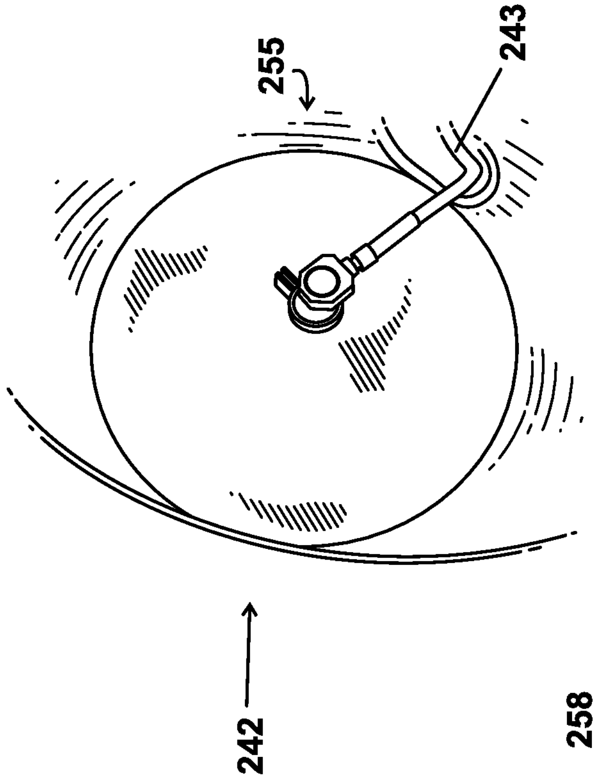
FIG. 33 is a partial perspective view of an alternate embodiment of the apparatus of the present invention.
Figure 32:
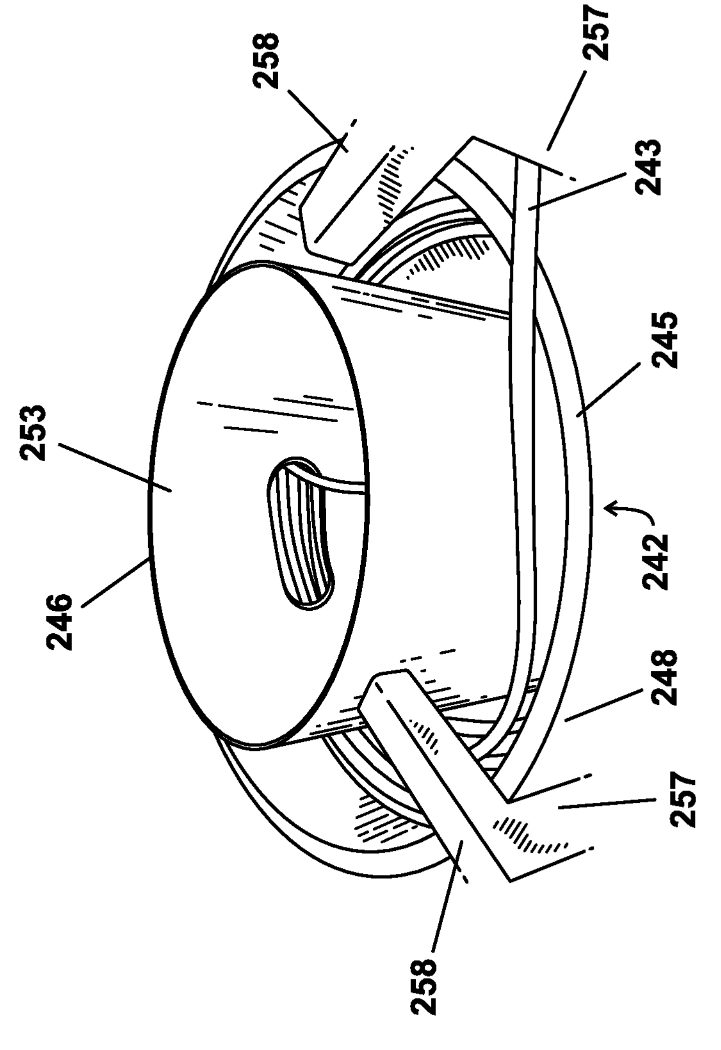
FIG. 32 is a partial perspective view of an alternate embodiment of the apparatus of the present invention.
Figure 35:
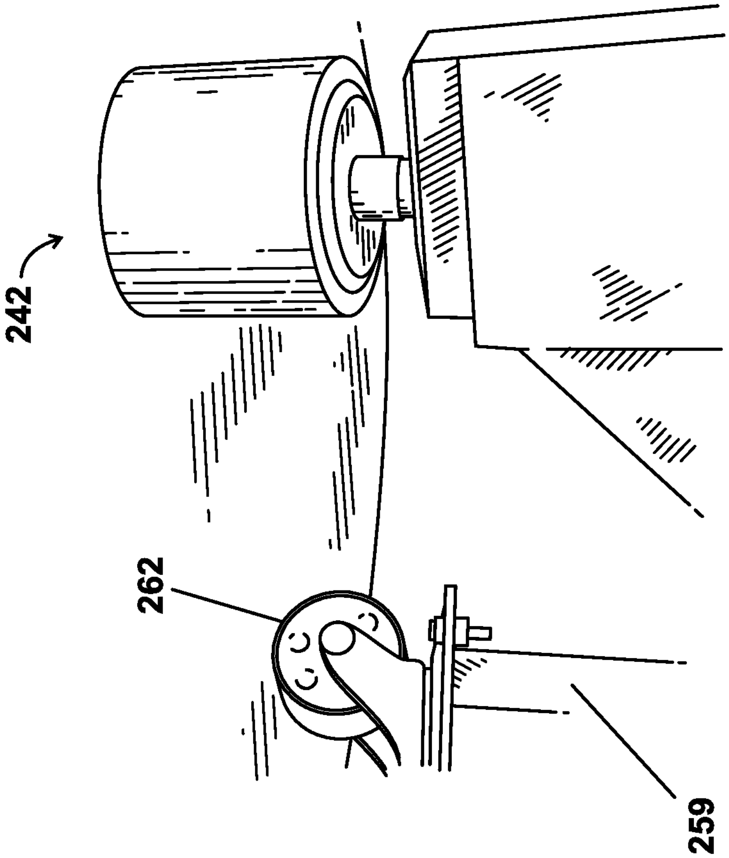
FIG. 35 is a partial perspective view of an alternate embodiment of the apparatus of the present invention.
Figure 34:
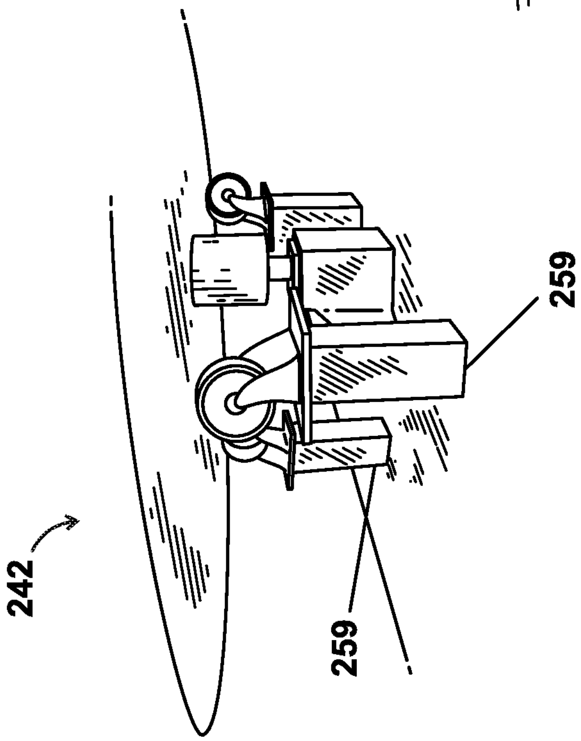
FIG. 34 is a partial perspective view of an alternate embodiment of the apparatus of the present invention.
Figure 37:
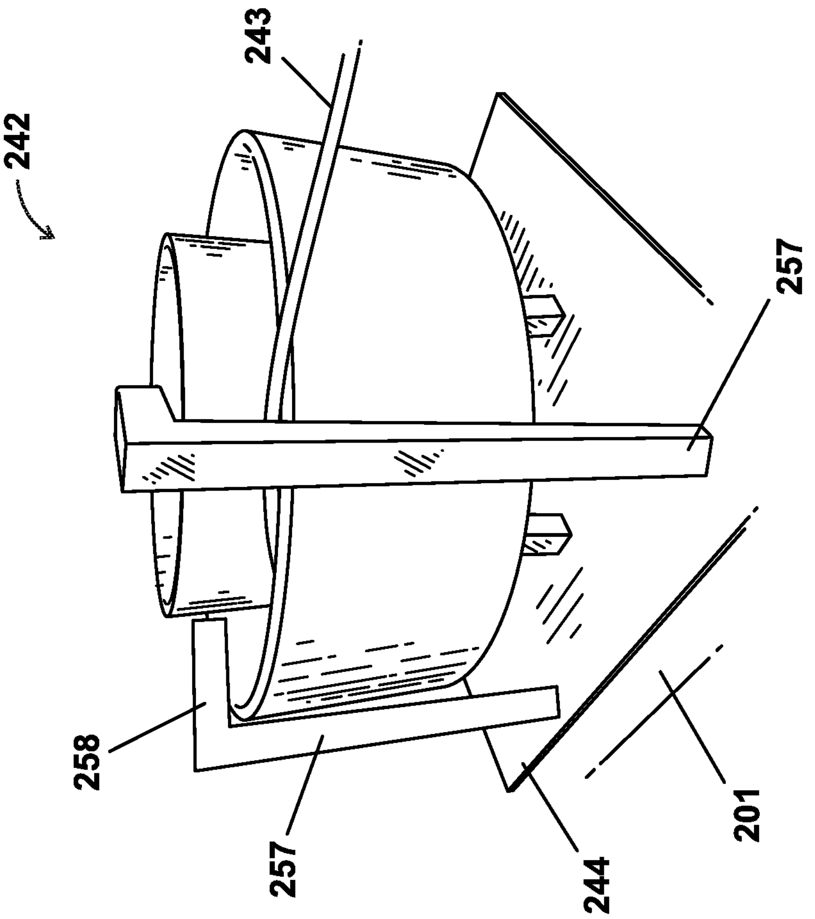
Figure 36:
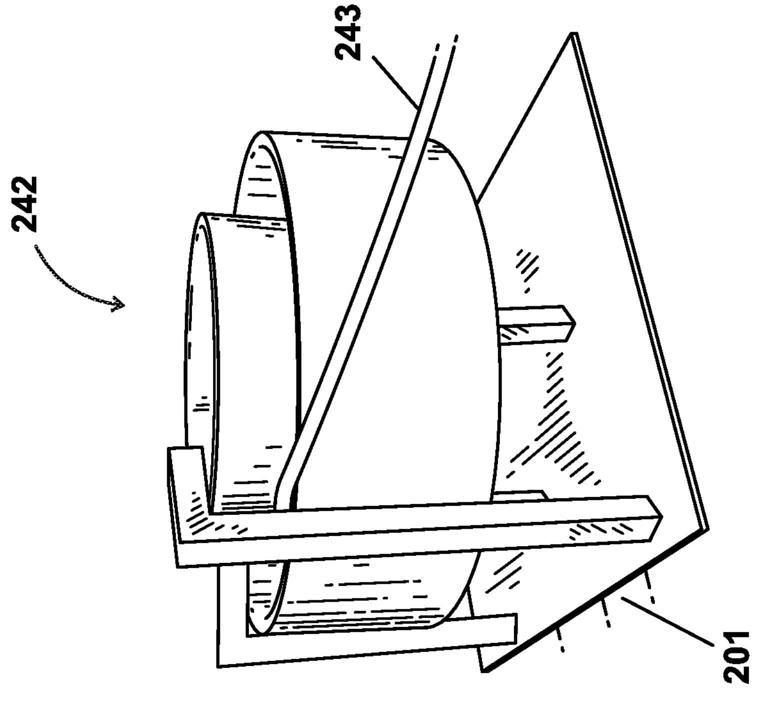
FIG. 36 is a partial perspective view of an alternate embodiment of the apparatus of the present invention; and, FIG. 37 is a partial perspective view of an alternate embodiment of the apparatus of the present invention.

FIG. 12A shows an alternate embodiment of the apparatus of the present invention, designated generally by the numeral 200A. In FIG. 12A, the riser cleaning apparatus 200A employs flow line 205 that conveys dirty, contaminated cleaning fluid from riser 11 to box/tank 210. In FIG. 12A, there is a flowline 237 that conveys fluid from tank or box 210 through filter or filters 236 to the cold/hot blending tanks or holding tanks 216, 217 on frame or trailer 201.

Tanks 216, 217 can be a single tank with an internal baffle 240. A baffle or baffles 240 can be provided to separate the single tank into tanks 216, 217. The baffle 240 would have one or more openings so that fluid flow could communicate between the tanks 216, 217. Flowline 238 conveys fluid from tanks 216, 217 to heat exchanger 213 on frame or trailer 202. A return flowline 239 conveys cooled fluid from heat exchanger 213 back to tanks 216, 217.

Fluid flows from tanks 216, 217 in flowline 218 to cold/hot blending tanks 228, 229 on frame or trailer 202. Tanks 228, 229 can be a single tank with an internal baffle 241 that separates the single tank into tanks 228, 229. Tanks 228, 229 can be insulated. Flowline 224 conveys fluid from the tanks 228, 229 to heat exchanger or chiller 220 on frame or trailer 202. Return line 225 conveys fluid from chiller 220 back to tanks 228, 229. As with tanks 216, 217, baffle 241 can be provided between tanks 228, 229. The baffle 241 could provide one or more openings so that there is fluid communication between the tanks 228, 229. Flowline 230 conveys fluid from tanks 228, 229 to high pressure pumping unit 232 on frame or trailer 201 which pump/power washer unit 232 supplies high pressure fluid to the cleaning tool 48 for cleaning the riser 11.

FIGS. 33-41 show an alternate embodiment wherein a specially configured hose containment and feed device 242 is preferably used to selectively pay out or retrieve high pressure hose 243 that is preferably used for pressure washing of the inside bore of a riser, riser section or tubular bore. The embodiment of FIGS. 33-41 preferably enable line control (paying out hose or retrieving hose) of the high-pressure hose line 243 out of or into containers 245, 246. This arrangement ergonomically assists the operators who feed the hose 243 to feeder 44. These operators had difficulty feeding the hose 243 and while simultaneously organizing the hose for tripping in and out multiple times per riser and at times all day long.

In FIGS. 29-37, there can be seen hose feed apparatus 242 with base or support 244 supporting outer container or drum 245 and inner container or drum 246. Base or support 244 can be mounted on a movable skid or trailer 201. Each container 245, 246 has a sidewall that can be rounded or generally cylindrically shaped. Outer container 245 has sidewall 248. Inner container 246 has sidewall 253.

Outer container 245 has floor or bottom 247. Inner container 246 has floor or bottom 254. Floors or bottom panels 247, 254 can be at different elevations or can be at the same elevation.

Inner sidewall 253 has a slot or opening 249. Slot or opening 249 is preferably receptive of hose 243 as the hose 243 extends between fitting 255 and feed device 44. Fitting 255 can be connected to floor or bottom panel 254 with weld or welds 256. The fitting 255 is preferably hard plumbed or piped to bracket 251 with a high pressure flow line connecting to bracket 251 and fitting 255 under trailer or skid 201. Fitting 255 can include a commercially available swivel 260 such as a model UH swivel from Stoneage, Inc. of Durango, Colorado. Fitting 255 preferably receives high pressure fluid from a high pressure pump. The fitting 255 can communicate with piping that extends through base or support 244 as well as through any under support such as a trailer or skid 201. Coupler 250 preferably forms an interface between hose 243 and fitting 255 so that fluid can flow from bearing or fitting 255 to hose 243.

Containers 245, 246 can be elevated above base/base plate 244 with feet 259. Each foot 259 preferably has a roller or wheel 262 that supports the containers 245, 246 as they rotate. Posts 257 are preferably connected (e.g., welded) to base/base plate 244. Each post 257 can have an upper end with a laterally extending arm 258.

Hose 243 extends from bearing/fitting 255 through opening or slot 249 into space or annular space 261 between outer wall 248 and inner wall 253. Hose 243 can be wrapped around inner wall 253 a number of times (or multiple wraps) as hose 243 is fed to containers 245, 246. Arms 258 can be used to retain hose 243 in annular space 261.

Hose 243 can be payed out from feed apparatus 242 or can be retrieved into feed apparatus 242. In either case, the hose 243 can be pulled or pushed using hose feed device 44 (e.g., commercially available "AutoBox" Model ABX-500). When paying out hose 243, both containers or drums 245, 246 rotate together wherein floor or bottom panel 247, 254 are preferably supported upon rollers 262 that are on feet 259. When viewed from above, paying out hose 243 preferably rotates containers or drums 245, 246 in a counter-clockwise direction. When retrieving hose 243, containers 245, 246 preferably rotate in a clockwise direction. When retrieving hose 243, the incoming hose 243 is preferably coiled or wrapped around the inner side wall 253 and occupies the space annular 261 between inner 253 and outer 248 side walls. The incoming hose 243 preferably extends through slot or opening 249. Hose 243 is preferably either pushed or pulled relative to containers or drums 245, 246 by hose feeder 44. The moving hose 243 preferably rotates the containers 245, 246 clockwise as the incoming hose 243 is pushed by the feed unit 44. The moving hose 243 preferably rotates the containers or drums 245, 246 counterclockwise as the hose 243 is pulled by hose feed unit 44.

Pipe 263 preferably connects between fitting 255 and hose 243.

The following is a list of parts and materials suitable for use in the present invention:

PARTS LIST

Part Number Description

10 riser cleaning apparatus
11 riser assembly
12 first end portion
13 second end portion
14 annular flange
15 larger diameter pipe
16 smaller diameter pipe
17 pipe bore (larger diameter)
18 pipe bore (smaller diameter)
20 disk/circular member
23 insulation/protective covering
24 concave portion/cavity
25 cap/shroud/fitting
26 cylindrical section
27 circular wall
28 inner surface
29 outer surface
30 inner surface
31 outer surface
32 gasket/seal
33 band
34 fastener/rivet
35 handle
36 central opening
37 flange
38 seal/rubber sheet
39 peripheral opening
40 flange
41 seal opening
43 hose/lance line
44 hose feed device/feed unit/hose feeder
45 outlet fitting
46 suction line
48 cleaning tool
51 strap
55 catch pan
60 back out preventer/hose and pressure washing tool retainer
61 pipe/riser
62 annular flange
63 bolt circle opening
64 mount/plate
65 mount/plate
66 longer flange/plate
67 longer flange/plate
68 shorter flange/plate
69 fastener plate
70 fastener plate
71 fastener plate
72 fastener plate
73 roller assembly
74 high pressure lance line/high pressure hose
75 enlarged nut/fitting/annular stop member ("hose stop")
76 coupling
77 roller frame
78 horizontal roller
79 vertical roller
80 upper guide
81 lower guide
82 bolted connection
83 bolted connection
84 arrows
85 slot
86 slot
87 bore
170 spool basket
172 reels or spools
174 upper section of spool basket
175 lower section of spool basket
176 housings
180 head of cleaning tool
182 tubular member of cleaning tool
184 extensions
185 orifice(s) of cleaning tool
186 wheels
200 riser cleaning system/apparatus
200A alternate embodiment of riser cleaning system/apparatus
201 frame/trailer/rack
202 frame/trailer/rack
203 fitting, cap
204 drain fitting/outlet
205 flow line
206 arrow
207 diaphragm pump
208 flow line
209 arrow
210 vessel/tank/cut box
211 flow line
212 arrow
213 cooling device/heat exchanger
214 flow line
215 arrow
216 holding tank
217 holding tank
218 flow line
219 arrow
220 chiller/heat exchanger
221 generator
222 electrical line
223 electrical line
224 flow line
225 flow line
226 arrow
227 arrow
228 insulated tank
229 insulated tank
230 flow line
231 arrow
232 power washer unit
233 foot pedal or air-operated toggle switch
234 air compressor
235 air line
236 filter
237 flowline
238 flowline
239 flowline
240 baffle
241 baffle
242 hose containment and feed apparatus
243 hose
244 base/base plate

245 outer container/drum
246 inner container/drum
247 outer floor/bottom
248 outer sidewall
249 slot/opening
250 coupler
251 bracket
253 inner side wall
254 inner floor/bottom
255 bearing/fitting
256 weld
257 post
258 arm
259 feet
260 swivel
261 annular space
262 roller/wheel
263 pipe All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of cleaning an oil and gas well riser section that has first and second end portions, the method comprising the steps of;

a) placing a fitting on the first end portion of the riser section, said fitting having a drain opening;
b) inserting a cleaning tool into a larger diameter tubular member of the riser section, wherein said cleaning tool cleans an inside surface of the larger diameter tubular member;
c) removing fluid from the cleaning operations of steps "a" and "b" via the drain opening;
d) wherein the fluid removed in step "c" has a temperature of between 100° F. and 220° F.;
e) filtering the removed fluid with a filter that is downstream of the drain opening of step "c";
f) transmitting the fluid to a first holding tank;
g) transmitting the fluid to a first heat exchanger;
h) transmitting the fluid to a second heat exchanger;
i) returning the fluid to the cleaning tool of step "b" after step "h"; and
j) wherein one of the heat exchangers employs a refrigerant and the other heat exchanger does not employ a refrigerant.

2. The method of claim 1, wherein the fluid in step "c" is between 10° and 180° F.

3. The method of claim 1, wherein the first holding tank has a capacity of between 700 and 900 gallons.

4. The method of claim 1, further comprising an annular flange on one of said end portions of the riser section, wherein said tubular member is connected to said annular flange, and in step "a" the fitting attaches to said annular flange.

5. The method of claim 4, wherein the flange has an outer diameter and the fitting has a peripheral skirt having a diameter that is equal to the flange outer diameter and step "a" includes attaching the fitting at the peripheral skirt to the annular flange.

6. The method of claim 1, wherein there are a pair of said fittings and one of said fittings is attached to each said end portion of the riser section in step "a".

7. The method of claim 6, wherein a suction is applied to each of the fittings to subject the larger diameter tubular member to a vacuum during steps "a" through "d".

8. The method of claim 7, wherein the vacuum at least in part holds the fittings to the riser section.

9. The method of claim 1, wherein the tank is upstream of the first heat exchanger and further comprising a second tank that is placed in between the first and second heat exchanger.

10. The method of claim 9 wherein fluid recirculates in both directions between at least one of the heat exchangers and the second tank.

11. The method of claim 1 further comprising one or more additional tanks that are positioned downstream of the heat exchangers and wherein fluid is transmitted from a second tank to the cleaning tool.

12. The method of claim 1 wherein first and second transportable frames are provided, wherein one or both heat exchangers are placed on one of the frames and a high pressure pump is placed on the other of the frames.

13. The method of claim 12 further comprising a second holding tank, wherein one of the holding tanks is on one of the transportable frames and the other of the holding tanks is on the other of the transportable frames.

14. The method of claim 13 wherein one or both of the heat exchangers are supplied with power from a generator and the generator is mounted on one of the transportable frames.

15. The method of claim 14 wherein both of the heat exchangers is on one of the transportable frames, and the generator is on the same transportable frame as are the heat exchangers.

16. The method of claim 15 wherein one of the holding tanks is on the same transportable frame as are the heat exchangers and water recirculates from one or both of the heat exchangers to the second holding tank via first and second flow lines.

17. The method of claim 1 wherein said cleaning tool has at least three leg extensions, the leg extensions each having a proximal portion attached to the tool that extends radially from the tool, and a distal portion that is parallel to the inside surface of the tubular member.

18. The method of claim 17 wherein the distal portion of the leg extensions also have one or more wheels on each leg, the wheels adapted to roll along the inside surface of the tubular member.

19. A method of cleaning an oil and gas well riser section while on location at an offshore well, the riser section having the method comprising the steps of;

a) placing a fitting on an end portion of the riser section, the said fitting having a drain opening;
b) inserting a cleaning tool into the riser wherein said cleaning tool cleans the inside surface of the riser;
c) removing fluid from the cleaning operations of steps (a) through (b) via the drain opening, wherein the removed fluid has a temperature of between 100 and 180° F.;
d) filtering the removed fluid with one or more filters that are downstream of the drain opening of step "c";
e) transmitting the fluid to a first holding tank;
f) after step "e" transmitting the fluid to a first heat exchanger;
g) transmitting the fluid to a second heat exchanger;
h) returning the fluid to the cleaning tool of step "b" after step "h"; and
i) wherein one of the heat exchangers employs a refrigerant and the other heat exchanger does not employ a refrigerant.

* * * * *